United States Patent
Guleryuz et al.

(10) Patent No.: US 8,311,334 B2
(45) Date of Patent: Nov. 13, 2012

(54) COMPLEXITY REGULARIZED PATTERN REPRESENTATION, SEARCH, AND COMPRESSION

(75) Inventors: Onur Guleryuz, San Francisco, CA (US); Jana Zujovic, Evanston, IL (US)

(73) Assignee: NTT DoCoMo, Inc., Tokyo (JP)

( * ) Notice: Subject to any disclaimer, the term of this patent is extended or adjusted under 35 U.S.C. 154(b) by 651 days.

(21) Appl. No.: 12/566,557

(22) Filed: Sep. 24, 2009

(65) Prior Publication Data
US 2010/0142829 A1 Jun. 10, 2010

Related U.S. Application Data

(60) Provisional application No. 61/110,418, filed on Oct. 31, 2008, provisional application No. 61/230,939, filed on Aug. 3, 2009.

(51) Int. Cl.
*G06K 9/00* (2006.01)
(52) U.S. Cl. .................................. 382/181; 382/242
(58) Field of Classification Search .......... 382/181, 382/242
See application file for complete search history.

(56) References Cited

U.S. PATENT DOCUMENTS

| | | | | |
|---|---|---|---|---|
| 7,308,139 | B2* | 12/2007 | Wentland et al. | 382/181 |
| 2003/0063812 | A1* | 4/2003 | Burke | 382/242 |
| 2005/0010626 | A1* | 1/2005 | Laksono et al. | 708/300 |
| 2008/0166043 | A1* | 7/2008 | Bassi et al. | 382/167 |

OTHER PUBLICATIONS

PCT International Search Report for corresponding PCT Patent Application No. PCT/US2009/062087, Aug. 9, 2010, 6 pgs.
PCT Written Opinion of the International Searching Authority for corresponding PCT Patent Application No. PCT/US2009/062087, Aug. 9, 2010, 10 pgs.
PCT International Preliminary Report on Patentability for corresponding PCT Patent Application No. PCT/US2009/062087, May 12, 2011, 10 pgs.
Bryt et al., "Compression of facial images using the K-SVD algorithm", Journal of Visual Communication and Image Representation, May 1, 2008, pp. 270-282, vol. 19—No. 14, Elsevier, Inc.
Yang et al., "Feature Selection in Face Recognition: A Sparse Representation Perspective", UC Berkeley Technical Report, Aug. 14, 2007, 19 pgs.
Buhmann et al., "Vector Quantization with Complexity Costs", IEEE Transactions on Information Theory, Jul. 1, 1993, pp. 1133-1145, vol. 39—No. 4.
Marpe et al., "Complexity-constrained best-basis wavelet packet algorithm for image compression", IEEE Proceedings: Vision, Image and Signal Processing, Institution of Electrical Engineers, Dec. 1, 1998, pp. 391-398, vol. 145—No. 6.
Mairal et al., "Discriminative Learned Dictionaries for Local Image Analysis", IEEE Conference on Computer Vision and Pattern Recognition, Jun. 23, 2008, 8 pgs., Piscataway, New Jersey, USA.

(Continued)

*Primary Examiner* — Hadi Akhavannik
(74) *Attorney, Agent, or Firm* — Blakely, Sokoloff, Taylor & Zafman, LLP

(57) ABSTRACT

A method and apparatus is disclosed herein for performing pattern representation, search and/or compression. In one embodiment, the method comprises extracting one or more target patterns from a portion of an image; forming a pattern matrix based on the one or more target patterns; approximating the pattern matrix using a complexity-regularized representation derived from the pattern matrix; and sending a query to search a library of images for vectors in the query to detect, using the a complexity-regularized representation, any image in the library that contains image patches similar to the one or more target patterns.

33 Claims, 15 Drawing Sheets

OTHER PUBLICATIONS

Barron, "Complexity Regularization With Application to Artificial Neural Networks", Nonparametric Functional Estimation and Related Topics, pp. 561-576, 1991, Kluwer Academic Publishers, Netherlands.

Alamouti, Siavash, "A Simple Transmit Diversity Technique for Wireless Communicatons", IEEE Journal on Select Areas in Communication, Oct. 1998, pp. 1451-1458, vol. 16, No. 8.

Chindapol, Alk, et al., "Design, Analysis, and Performance Evaluation or BICM-ID with Square QAM Constellations in Rayleigh Fading Channels", IEEE Journal on Select Areas in Communication, May 2001, pp. 944-957, vol. 19, No. 5.

Higuchi, Kenichi, et al., "Adaptive Selection of Surviving Symbol Replica Candidates Based on Maximum Reliability in QRM-MLD for OFCDM MIMO Multiplexing", IEEE Communications Society Globecom 2004, pp. 2480-2486.

Lowe, David G., "Object Recognition from Local Scale-Invariant Features", Proceedings of the International Conference on Computer Vision, Sep. 1999, pp. 1-8.

Christopoulos, Charilaos, et al., "The JPEG2000 Still Image Coding System: An Overview", IEEE Transactions on Consumer Electronics, Nov. 2000, pp. 1103-1127, vol. 46, No. 4.

Wong, Kitty Kar Yan, "The Soft-Output M-Algorithm and It's Applicatio s", Aug. 2006, 263 pgs.

Lee, Inkyu, et al., "Space-Time Bit-Interleaved Coded Modulation for OFDM Systems", IEEE Transactions on Signal Processing, Mar. 2004, pp. 820-825, vol. 52, No. 3.

Lee, Heunchul, et al., "A Flexible Space-Time Coding System with Unequal Error Protection", 2005, 5 pgs.

Lee, Inkyu, et al., "Reduces-Complexity Receiver Structures for Space-Time Bit-Interleaved Coded Modulation Systems", IEEE Transactions on Communications, Jan. 2007, pp. 142-150, vol. 55, No. 1.

Lee, Inkyu, et al., "Code Construction for Space-Time Bit-Interleaved Coded Modulation Systems", IEEE Communications Society, 2004, pp. 722-726.

Li, Xiaodong, et al., "Bit-Interleaved Coded Modulation With Iterative Decoding and 8PSK Signaling", IEEE Transactions on Communications, Aug. 2002, pp. 1250-1257, vol. 50, No. 8.

Noh, Yujin, et al., "Design of Unequal Error Protection for MIMO-OFDM Systems with Hierarchical Signal Constellations", Journal of Communications and Networks, Jun. 2007, pp. 167-176, vol. 9, No. 2.

Cohen, Albert, et al., "On the Importance of Combining Wavelet-Based Nonlinear Approximation With Coding Strategies", IEEE Transactions on Information Theory, Jul. 2002, pp. 1895-1921, vol. 48, No. 7.

Seshardi, Nambirajan, et al., "List Viterbi Decoding Algorithms with Applications", IEEE Transactions on Communications, Feb./Mar./Apr. 1994, pp. 313-323, vol. 42, No. 2/3/4.

Shi, Jianbo, et al., "Good Features to Track", 1994, pp. 593-600.

Taoka, Hidekazu, et al., "Field Experiments on Ultimate Frequency Efficiency Exceeding 30 Bit/Second/Hz Using MLD Signal Detection in MIMO-OFDM Broadband Packet Radio Access", 6 pgs, 2007.

Wiegand, Thomas, et al., "Draft Text of Final Draft International Standard (FIDS) of Joint Video Specification (ITU-T REC. H.264 | ISO/IEC 14496-10 AVC)", Mar. 2003, 264 pgs.

* cited by examiner

Figure 1: Example texture images.

ROI marked on an image
(A)
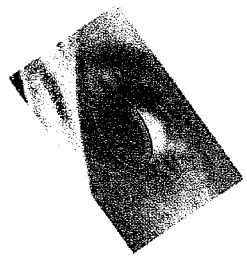
ROI deformed to match
geometrical image deformation
(B)
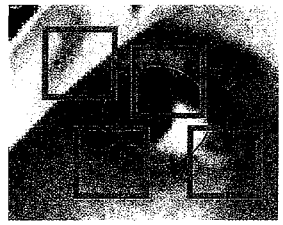
Example W x H blocks at least
partially overlapping the ROI
(C)
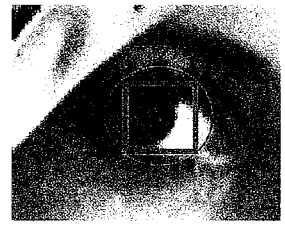
Example W x H block completely
overlapping the ROI
(D)
Figure 3: Example region of interest (ROI) and example blocks overlapping the ROI.

COMPLEXITY REGULARIZED PATTERN REPRESENTATION, SEARCH, AND COMPRESSION

PRIORITY

The present patent application claims priority to and incorporates by reference the corresponding provisional patent application Ser. No. 61/110,418, titled, "Complexity Regularized Pattern Representation, Search, and Compression" filed on Oct. 31, 2008 and the corresponding provisional patent application Ser. No. 61/230,939, titled, "Extensions to Complexity Regularized Pattern Representation, Search, and Compression, filed on Aug. 3, 2009.

FIELD OF THE INVENTION

The present invention relates to the field of representation and compression of manifolds of pattern signals (e.g., images, video, audio, or localized patches/regions obtained from images, video, audio, etc.); more particularly, the present invention relates to methods that efficiently represent patterns for compression, search, and retrieval with minimal descriptive and computational complexity.

BACKGROUND OF THE INVENTION

In many applications, one is concerned with the efficient representation, search, compression, and retrieval of signals or signal patches. For example, in example-based image (video) search and retrieval, one considers whether a given image (video) or various modified forms of it are present in a library of images (video sequences). To tackle such a task, one typically derives a signature from the example image or video and compares it to signatures of the images and video sequences in the library. These signatures are obtained through linear and nonlinear representations of images and video sequences. In compression, one represents images/video in terms of typically linear representations that are expected to provide compact descriptions. The parameters of the image/video in terms of these representations are then transmitted to a destination where a faithful reconstruction of the image is constructed. Similarly, in applications for image/video analysis, recognition, etc., one considers image parameters in terms of given representations and formulates the problem in terms of these parameters.

Existing techniques tackling representation, search, and compression problems are formulated in terms of representations that are constructed to perform reasonably over a model set, $\Psi$, of images and video sequences. The per-image or per-video-sequence adaptivity of these techniques is thus very limited which becomes an important problem when the target image or video sequence is not conforming to the model set $\Psi$. For example, in compression, established techniques use fixed linear representations such as Discrete Cosine Transform (DCT), wavelet transform, etc. The model set for such linear representations is the set of image/video that can be closely approximated with few coefficients using the given representation. For example, for the wavelet transform, this set is well known to be the set of signals with point singularities.

Existing representations perform very well when target images or video sequences are in their model set but have very inadequate performance when they are not. For example, on images and video sequences depicting textures, such as shown in FIG. 1, the performance of techniques based on such representations tend to be completely inadequate, leading to very inefficient descriptions. Similarly in image/video search, analysis, and recognition applications, established techniques use predefined features that are expected to perform reasonably well over the model set under simple distortions/deformations. These techniques become completely inadequate when the application requires operation under different types of distortions and they generate non-compact descriptions which computationally complicate and sometimes completely disrupt good performance. As they are not adaptive and as they are typically designed for worst-case performance, these techniques are neither optimal nor adequate over a given narrow set of signals and over given set of distortions.

Existing methods are also not generalizable to other types of signals as they are based on adhoc observations on images made by humans: corners are deemed important, lines are deemed important, etc. Since existing methods are based on human observations, they provide no clear guidelines as to what the features/signatures/representations should be for different types of signals, such as audio data, seismic data, medical signals like cardiograms, time series data, higher dimensional medical images depicting volumes, etc.

Another important issue that is lacking in established work is the lack of any guarantees of successful compression, search, recovery, etc. Nor can existing techniques guarantee a certain level of success for a given amount of computational complexity. For example, if infinite complexity is allowed, then clearly one can design very accurate search/retrieval strategies. When complexity is limited however, one needs to utilize the available resources effectively by making the optimal tradeoffs. Established techniques are by no means making the optimal tradeoff when allowed complexity is limited. In fact, complexity issues are not even directly addressed since features are adhocly designed with the hope that they will result in good performance.

SUMMARY OF THE INVENTION

A method and apparatus is disclosed herein for performing pattern representation, search and/or compression. In one embodiment, the method comprises extracting one or more target patterns from a portion of an image; forming a pattern matrix based on the one or more target patterns; approximating the pattern matrix using a complexity-regularized representation derived from the pattern matrix; and sending a query to search a library of images for vectors in the query to detect, using the a complexity-regularized representation, any image in the library that contains image patches similar to the one or more target patterns.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 3A-3D illustrate an example of a region of interest (ROI) and an example of blocks overlapping the ROI.

DETAILED DESCRIPTION OF THE PRESENT INVENTION

Figure 1:
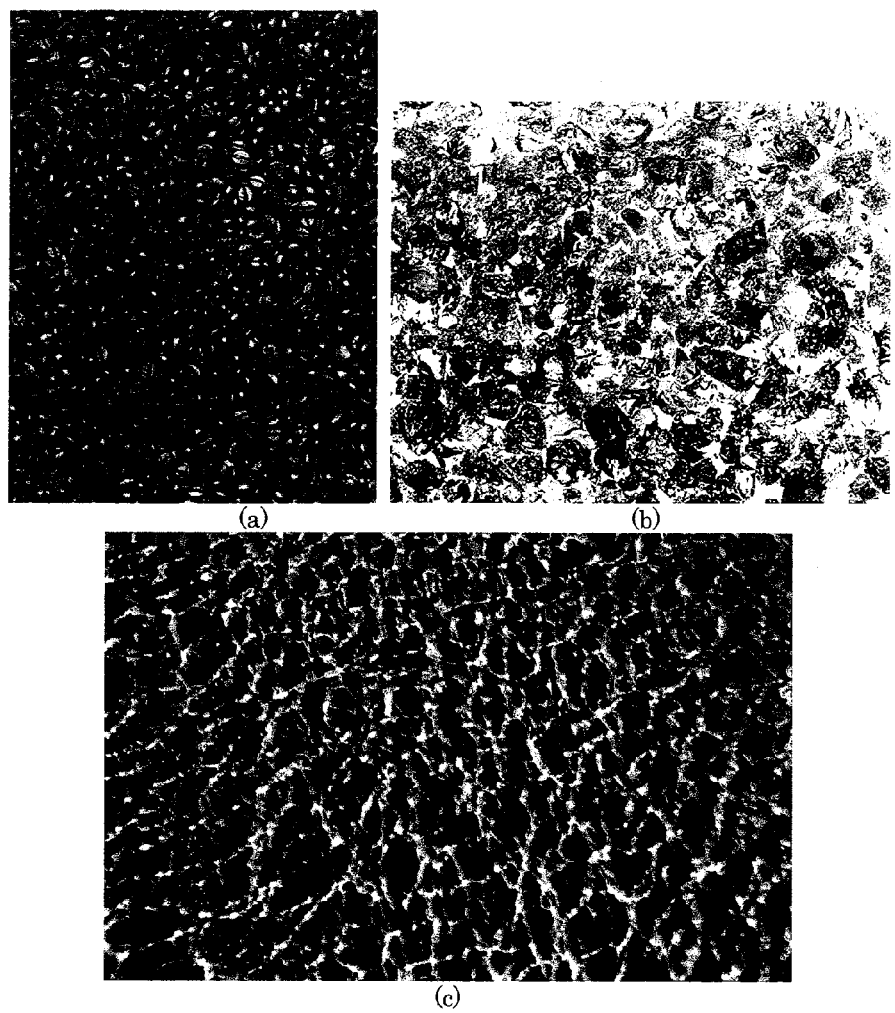
FIG. 1 illustrates examples of texture images.

Methods and apparatuses for search and compression are described. Embodiments illustrate these methods and apparatuses using regularized pattern matching techniques that utilize complexity to control their operation.

Embodiments of the invention include, for a given set of images, video sequences (from hereon image/video patches): methods that construct a pattern manifold (termed "pattern-bag") that contains patches and all versions of them that are of interest in a particular application; methods that design an adaptive representation for the patterns in the pattern-bag where the adaptive representation is intimately tuned to the properties of the patterns in the pattern-bag, describes the patterns in the most compact way, approximates the patterns optimally for a given descriptive complexity, enables search, analysis, and recognition applications concerning the patterns in the pattern-bag to be successfully performed with the least computational complexity, and allows approximation and compression applications concerning the patterns in the pattern-bag to be performed with minimal descriptive complexity; methods that efficiently search an image/video library to find out which patterns in the pattern-bag are present in the library; methods that organize a library for efficient search and retrieval; and methods that efficiently compress the patterns in the pattern-bag.

Techniques described herein give mathematical guidelines, algebraic design methodologies, formulae, and optimization strategies that allow one to construct optimized search, retrieval, and compression applications on arbitrary sets of signals.

Furthermore, the techniques disclosed below accurately define success and result in guaranteed performance. Techniques described below also include the optimal tradeoff between successful application performance and descriptive/computational complexity. Also, presented techniques are highly parallelizable and can be implemented on parallel hardware, such as multi-core processors, GPUs, etc.

For purposes herein, we will use the example case of operation on images. Operation for other types of signals, such as audio, video, acoustic signals, medical images and volumes, time series, etc., is similarly determined.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments include two general algorithms that target compression ("Complexity Regularized Pattern Compression") and search ("Complexity Regularized Pattern Search") applications. The Complexity Regularized Pattern Compression and Pattern Search algorithms, in turn, rely on a third algorithm that is referred to herein as the "Complexity Regularized Pattern Representation" algorithm.

The first operation in enabling these algorithms involves the definition and construction of a set of image/video patches that referred to herein as patterns. In one embodiment, this is performed by extracting image/video patches, represented in a column vector form, potentially with the aid of defined regions of interest. In one embodiment, the extracted patches are ordered using lexicographic ordering. The set of patterns thus obtained for representation (organized into the columns of a matrix P) will also be referred to herein as the "pattern-bag".

The construction of the pattern-bag, P, is described for the Complexity Regularized Pattern Search with the aid of a search-by-example application in which a user provides an image and specifies a region of interest and a search of images in a library that depict regions similar to the provided region of interest occurs. Since construction of P involves the collection of a set of image/video patches, the process can straightforwardly be generalized for several images, for video sequences, and for other scenarios.

Assume that the user provides an image and specifies the Region of Interest (ROI). The image regions specified in the ROI are to be detected in a library of images, i.e., any image in the library that contains image patches similar to the ones depicted in the ROI is to be detected. The construction starts by extracting rectangular, W×H patches that at least partially overlap the ROI. W and H can, for example, be 4, 8, 16, 17, 24, 31, 143, etc. In one embodiment, W and H are specified by the user. Nonrectangular patches, disconnected unions of patches, etc., can also be extracted. In one embodiment, all W×H patches that at least partially overlap the ROI are extracted, which allows a translation invariant operation, i.e., if the construction starts with a translated image and a translated ROI, the same patches are extracted. In an alternative embodiment, patches are extracted to satisfy a minimum overlap constraint. For example, patches that at least partially overlap the ROI and are at even pixel locations can be extracted. Extracting patches smaller than the ROI and that partially overlap the ROI allows the algorithm to have the capability of detecting visible portions of the ROI in cases of partial occlusions. Generally, the larger the size of the extracted patterns, the less robust the algorithm is expected to be to occlusions. On the other hand, very small patches are expected to result in false alarms. All patches of the specified size that have the required minimum overlap with ROI are extracted, arranged into vectors, and put into the pattern-bag.

Figure 2:
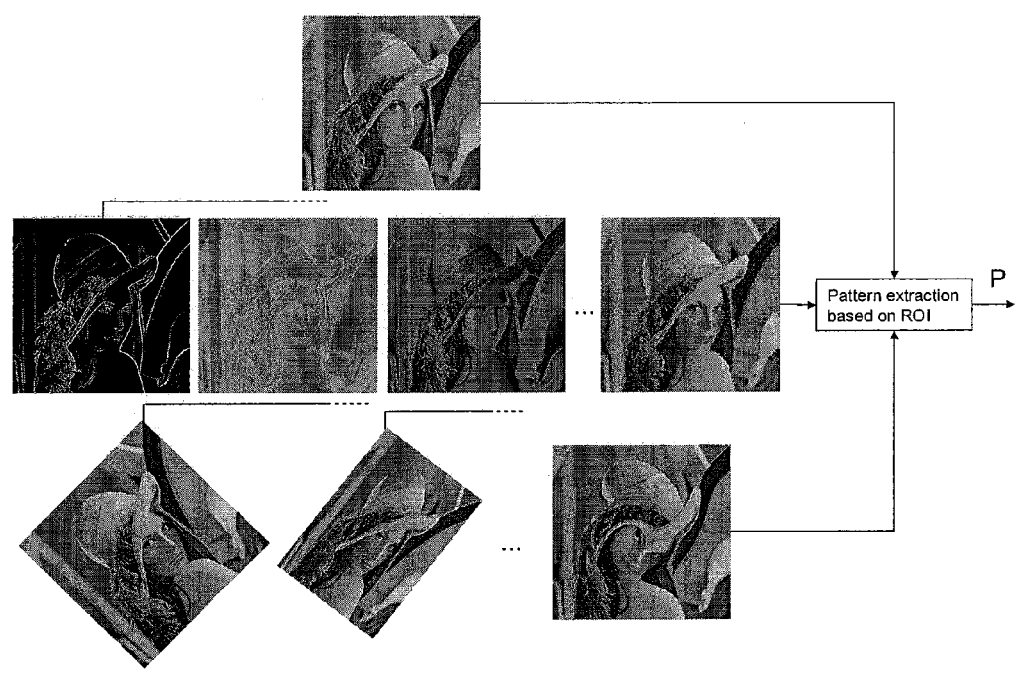
FIG. 2 illustrates an example image and its example deformations used in the construction of the pattern-bag.

To assure robustness to image deformations, if desired, the process is repeated on versions of the example image that have undergone specific operations, such as lighting or geometrical deformations, rotations and so on. FIG. 2 illustrates an example image and its example deformations used in the construction of the pattern-bag. FIGS. 3A-3D illustrate examples of a region of interest and example blocks overlapping the ROI. More specifically, FIG. 3A illustrates a ROI marked on an image, FIG. 3B illustrates the ROI of FIG. 3A deformed to match a geometrical image deformation, FIG. 3C illustrates example W×H blocks at least partially overlapping the ROI, and FIG. 3D illustrates an example W×H block completely overlapping the ROI. For example, if rotation invariant operation is desired, then the example image can be rotated over the desired rotation range to yield k images, each of which undergoes the pattern extraction process to further populate the pattern-bag. In case of rotations and geometric deformations, the ROI is also suitably deformed so that the ROI in the deformed images match the regions identified in the original image when the geometrical deformation is undone.

Figure 4:
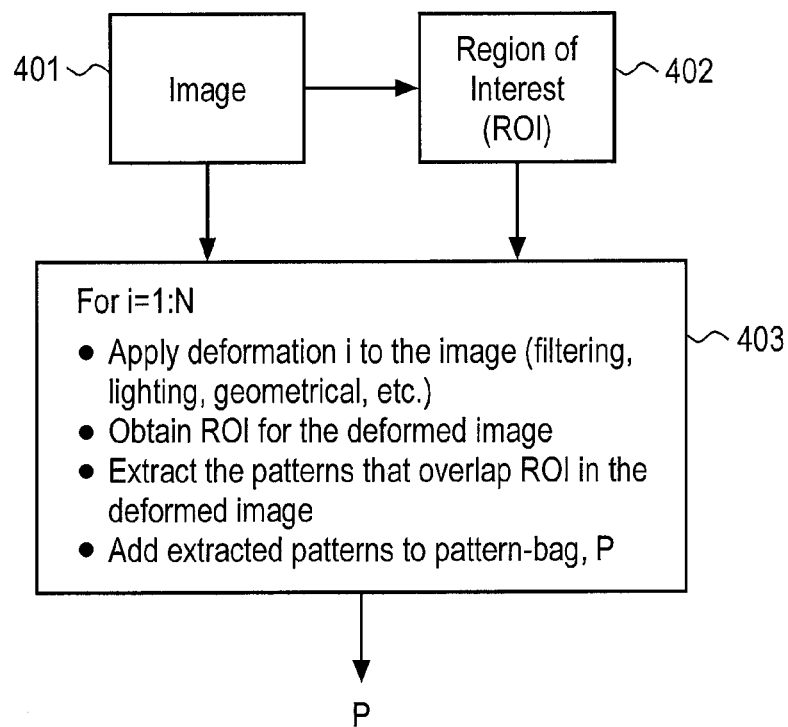
FIG. 4 is a flow diagram of one embodiment of a process for constructing a pattern-bag.
Figure 8:
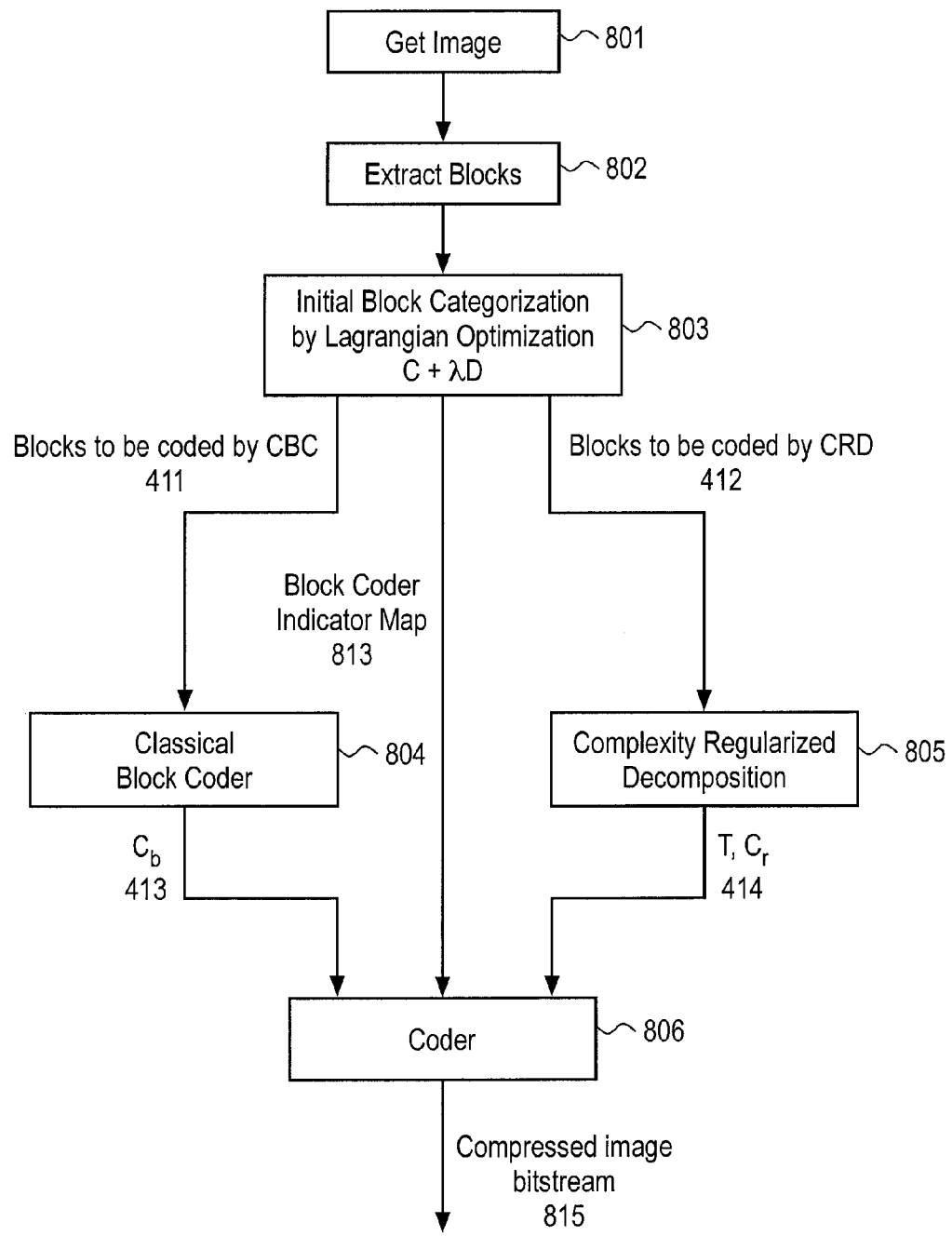
FIG. 8 is a flow diagram of one embodiment of a process for compressing images using descriptive complexity regularized decomposition.

FIG. 4 is a flow diagram of one embodiment of a process for constructing a pattern-bag. The process is performed by processing logic that may comprise hardware (e.g., dedicated logic, circuitry, etc.), software (such as is run on a general purpose computer system or a dedicated machine), or a combination of both. The process is as follows:

1. Receive an image (processing block 401)
2. Determine Region of Interest (ROI) (processing block 402)
3. For i=1:N
    apply deformation i to the image (filtering, lighting, geometrical, etc.)
    obtain ROI for the deformed image
    extract the patterns that overlap ROI in the deformed image
    add extracted patterns to pattern-bag, P
    (processing block 403)
4. Output pattern-bag P The pattern-bag construction for Complexity Regularized Compression is similar to the above procedure except that non-overlapping blocks of size W×H are extracted from the image to be coded (compressed). This extraction operation can be done so that all non-overlapping blocks of size W×H are extracted, only portion of the non-overlapping blocks are extracted, etc. For example, for uniform images such as those in FIG. 1, all non-overlapping blocks can be extracted so that each pixel is in one block. For images that depict non-uniform regions (e.g., a face image on top of a texture image), only the non-overlapping blocks on the texture regions can be extracted, etc. In one embodiment, the extraction process is done in a way that is optimal from a compression standpoint, i.e., regions that are well represented with traditional representations are handled through traditional compression and remaining regions are handled through the complexity regularized representation. An example of such a process is shown in FIG. 8, which is described in more detail below.

Once the pattern-bag is constructed, the next operation is the derivation of the Complexity Regularized Representation. Assume that M patches are extracted and all of the extracted W×H patches are ordered into vectors placed in the columns of the N×M matrix P, i.e., M patterns with each pattern corresponding to N pixel values. The goal then is to find matrices T (N×K) and C (K×M) that represent a factorizing decomposition of P, which, in the case of perfect reconstruction, would yield:

$$P = T \cdot C$$

For purposes herein, columns of T are referred to as the pattern basis with the i-th column of C containing the basis expansion coefficients of the i-th pattern (column) in P. Let $t_i$, $p_i$, $\alpha_i$ denote the i-th column of T, P, and C respectively. Let C(l,i) denote the element in the l-th row and i-th column of C. Note that there are K pattern basis, i.e., at most K basis functions are utilized in representing any pattern via $$p_i = \sum_{l=1}^{K} C(l, i)t_1 = \sum_{l=1}^{K} \alpha_i(l)t_1.$$

K is determined by the algorithm which designs the optimal T, C as discussed below.

In one embodiment, the design of the Complexity Regularized Representation, T and C, is optimized for the target application. In order to discuss the optimization of the representation, first the Complexity Regularized Pattern Search and Complexity Regularized Pattern Compression algorithms are described, followed by a detailed description of the design of the representation.

The Complexity Regularized Pattern Search Algorithm

One embodiment of the Complexity Regularized Pattern Search algorithm can be summarized as follows in conjunction with FIG. 5. The process of FIG. 5 is performed by processing logic that may comprise hardware (circuitry, dedicated logic, etc.), software (such as is run on a general purpose computer system or a dedicated machine), or a combination of both.

Figure 5:
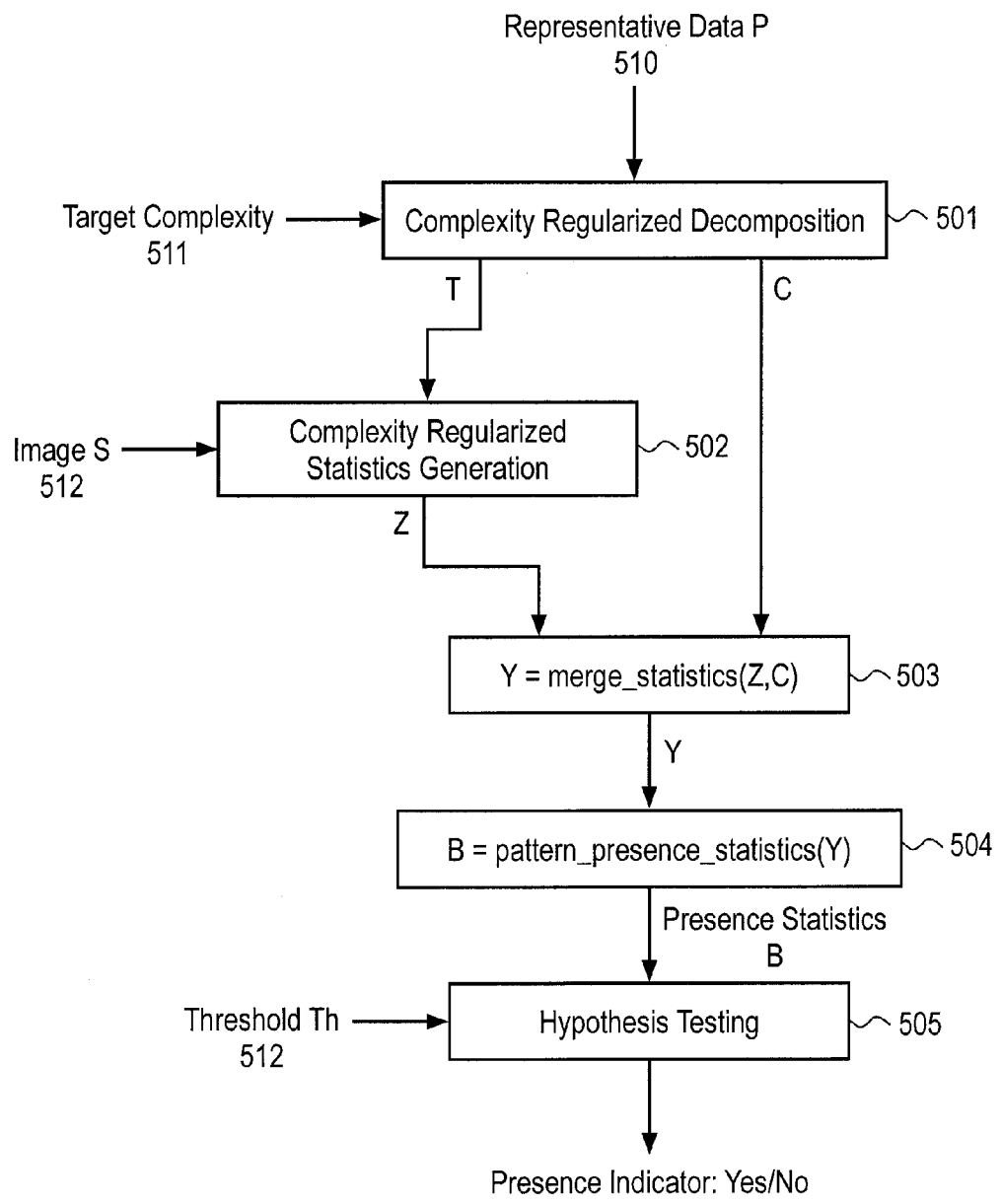
FIG. 5 is a flow diagram of one embodiment of a process for searching for patterns in images using computational complexity regularized decomposition.

Referring to FIG. 5, the process begins by performing a complexity regularized decomposition on representation data P based on a target complexity (511) (processing block 501). This produces T and C as outputs, which are used in the remainder of the process as follows:

i. For a given image from the library, extract a candidate W×H patch, s (512). The search process checks whether any pattern in the pattern-bag (any column of P) is approximately equal to s. In one embodiment the pattern basis and the candidate patch are normalized to unity, i.e., $t_i^T t_i = 1$, $p_i^T p_i = 1$, $s^T s = 1$. In another embodiment, normalization is not done. For convenience, in the present discussion assume that normalization has been done.

a. For each pattern $p_i$, find the correlation coefficient, $Y_i = s^t p_i$, with the patch s (512). Since every pattern can be represented in terms of T and C, this step is equivalent to generating the "Complexity Regularized Statistics" matrix Z (1×K):

$$Z = s^T \cdot T,$$

(processing block 502) and then combining this matrix with C in order to obtain correlation results for all patterns via $$Y = Z \cdot C$$

Figure 6:
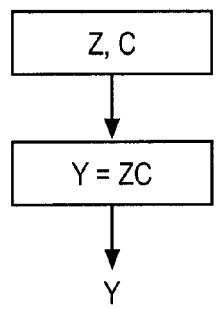
FIG. 6 is a flow diagram of one embodiment of a process for calculating merged statistics.

(processing block 503). This is shown in FIG. 6.

b. Once Y (1×M) is generated, the "Pattern Presence Statistics" are obtained for i=1, ..., M via $$B_i = 1 - Y_i^2$$

Figure 7:
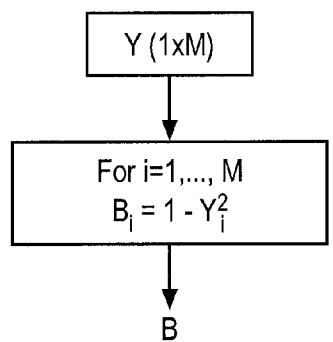
FIG. 7 is a flow diagram of one embodiment of a process for calculating pattern presence statistics.

(processing block 504). This is shown in FIG. 7.

ii. For pattern i, the pattern presence statistic, $B_i$, is compared to a threshold (512) to determine if pattern i is present in the patch s or not (processing block 505). In one embodiment, the output of the process causes a presence indicator to be set to no or yes.

iii. The process is repeated for all candidate patches from the image and for all candidate images in the library.

Let $\|A\|_0$ denote the number of non-zero entries in a matrix A. It can be shown that the total number of operations required to compute all the statistics for all the patterns is equal to the computational complexity $$C = \|C\|_0 + \|T\|_0.$$

Hence, in one embodiment, the optimal Complexity Regularized Representation for this search application is derived in processing block 501 as:

$$\{T^*, C^*\} = \underset{T,C}{\operatorname{argmin}} \|P - T \cdot C\|_2^2 + \lambda(\|C\|_0 + \|T\|_0) \quad (1)$$

where $\mathcal{D} = \|P - T \cdot C\|_2^2$ is the distortion that the representation has in representing the given pattern set in P, $\|C\|_0 + \|T\|_0$ denotes the complexity of the search with this representation, $\lambda \geq 0$ is a regularization parameter that enforces the complexity constraint $\|C\|_0 + \|T\|_0 = \mathcal{C}$ and T*,C* yield the optimal representation. Observe that through the optimization in (1), the representation that is closest to the pattern-bag and that will accomplish the search task with a given complexity $\mathcal{C}$ is the representation being sought. In one embodiment, $\mathcal{C}$ is determined with respect to the platform on which the search will be done and is quantified in terms of allowable number of multiply/add operations per candidate patch. Note that, as $\mathcal{C}$ is allowed to increase, $\mathcal{D}$ will decrease, which will in turn results in perfect determination of pattern presence. As $\mathcal{C}$ is lowered, more false alarms and misses may result during the search, which is the penalty for doing a simple/fast search.

For the Complexity Regularized Pattern Compression application, consider the high resolution case that each pattern in P will be compressed as follows:

i. Since the pattern basis is specific to P, T needs to be compressed and sent to the decoder.

ii. For each pattern (i-th column of P), the pattern's basis expansion coefficients $\alpha_i$ (i-th column of C) need to be compressed and sent to the decoder.

FIG. 8 is a flow diagram of one embodiment of a process for compressing images using descriptive complexity regularized decomposition. The process is performed by processing logic that may comprise hardware (e.g., dedicated logic, circuitry, etc.), software (such as is run on a general purpose computer system or a dedicated machine), or a combination of both. The process is as follows:

1. Get Image (processing block 801)
2. Extract Blocks (processing block 802)
3. Perform Initial Block Categorization by Lagrangian Optimization $\mathcal{C} + \lambda \mathcal{D}$
   (processing block 803)
4. For blocks to be coded by CBC, use classical block coder (processing block 804)
5. For blocks to be coded by CRD, use Complexity Regularized Decomposition (processing block 805)
6. Use coder to code Block Coder Indicator Map (813), $C_b$ (815), $T, C_r$ (814) (processing block 806)
7. Output compressed image bitstream (processing block 815)

In FIG. 8, the classical block coder (CBC) uses a fixed basis $T_{fixed}$ (such as the Discrete Cosine Transform (DCT)) and hence does not need to send the basis information to the decoder. The block categorization determines those blocks that can be better compressed with Complexity Regularized Decomposition, CRD, versus those that can be better compressed with CBC. An embodiment for doing such categorization is detailed later in this application.

In one embodiment, using a nonlinear approximation model to approximate the compression process (A. Cohen, I.

Daubechies, O. G. Guleryuz, and M. T. Orchard, "On the importance of combining wavelet-based nonlinear approximation with coding strategies," IEEE Transactions on Information Theory, vol. 48, no. 7 pp. 1895-1921, July 2002) the descriptive complexity, $\mathcal{C}$, for representing the pattern-bag can be approximated as the number of nonzero values in C and in T, which is again $$\mathcal{C} = \|C\|_0 + \|T\|_0. \tag{2}$$

Even though it is not always the case that the complexity is directly proportional to the rate of the actual coder, in most cases, rate and complexity are highly correlated.

This shows that for both Pattern Search and Pattern Compression, the problem that is needed to be solved is to find T and C that minimize $$\|P - T \cdot C\|_2^2 + \lambda(\|C\|_0 + \|T\|_0), \tag{3}$$

which corresponds to having the most faithful representation of the patterns in P with as few non-zero samples as possible in T and C.

To solve this optimization problem, an iterative process between updating the coefficients in C and pattern basis in T is used. For a given regularization parameter $\lambda \geq 0$, the algorithm accepts the pattern-bag P and initial matrices $T_{init}$ and $C_{init}$, and then the algorithm proceeds in the following manner to solve the optimization problem in (1). For purposes herein, the metric that is being minimized is referred to as $\Delta$ so that:

$$\Delta(P, T, C, \lambda) = \mathcal{D}(P, T, C) + \lambda \mathcal{C}(T, C) \tag{4}$$
$$= \|P - T \cdot C\|_2^2 + \lambda(\|C\|_0 + \|T\|_0)$$

Figure 9:
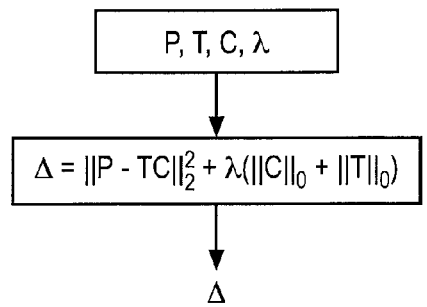
FIG. 9 is a flow diagram of one embodiment of a process for calculating delta.

This is shown in FIG. 9.

For given initial matrices, initially iterations of interchangeably updating elements of C and then of T are performed, which are referred to herein as "TC_Iterations". Within "TC_Iterations" a procedure called "Optimized_Decomposition" performs the main optimization calculations.

Figure 10:
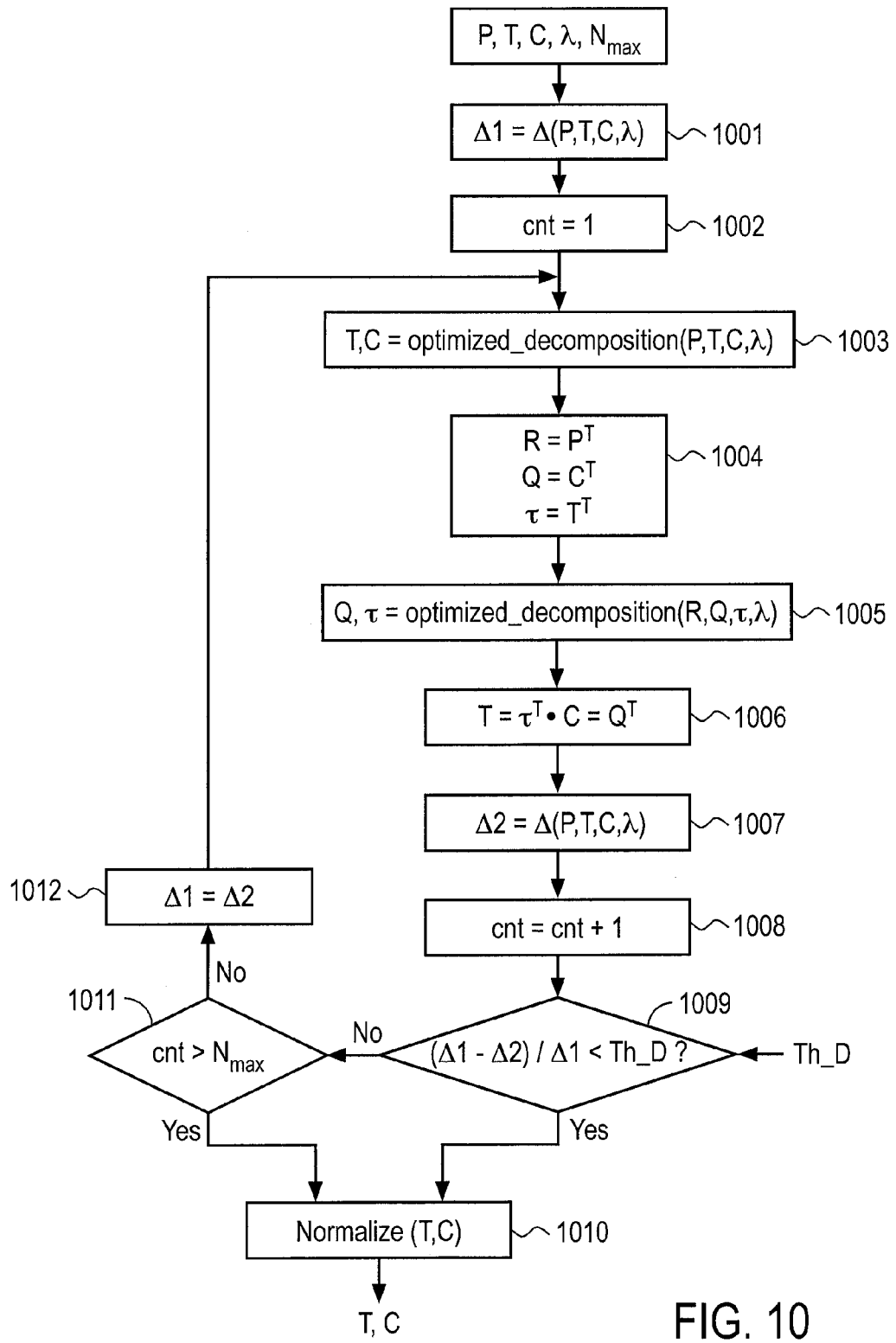
FIG. 10 is a flow diagram of one embodiment of a process for calculating T and C iterations.

One embodiment of the procedure [T, C]=TC_Iterations(P, T, C, $\lambda$) is performed by processing logic and is described in FIG. 10. The process is performed by processing logic that may comprise hardware (e.g., dedicated logic, circuitry, etc.), software (such as is run on a general purpose computer system or a dedicated machine), or a combination of both. The process is as follows:

1. Compute $\Delta 1 = \Delta(P, T, C, \lambda)$ (processing block 1001)
2. Set cnt=1 (processing block 1002)
3. Perform [T,C]=Optimized_Decomposition(P, T, C, $\lambda$) (processing block 1003)
4. Set $R = P^T$ $Q = C^T$ $\tau = T^T$ (processing block 1004)
5. Perform [Q,$\tau$]=Optimized_Decomposition(R, Q, $\tau$, $\lambda$) (processing block 1005)
6. Set $C = Q^T$ $T = \tau^T$ (processing block 1006)
7. Compute $\Delta 2 = \Delta(P, T, C, \lambda)$ (processing block 1007)
8. Increment cnt by 1 (processing block 1008)
9. Check if the relative change $(\Delta 1 - \Delta 2)/\Delta 1$ is less than a given threshold Th_D (processing block 1009), or if a given maximum number of iterations has been reached (processing block 1011); otherwise, set $\Delta 1 = \Delta 2$ (processing block 1012) and go to 2 (processing block 1013).
10. [T,C]=Normalize_Decomposition(T, C) (processing block 1010)
11. Return T, C.

After the procedure is carried out, T and C can be suitably scaled in ways that preserve their product TC in order to accommodate various applications. Without loss of generality, it is assumed that the scaling is so that the pattern basis is normalized to 1, i.e., $t_i^T t_i = 1$.

Figure 11:
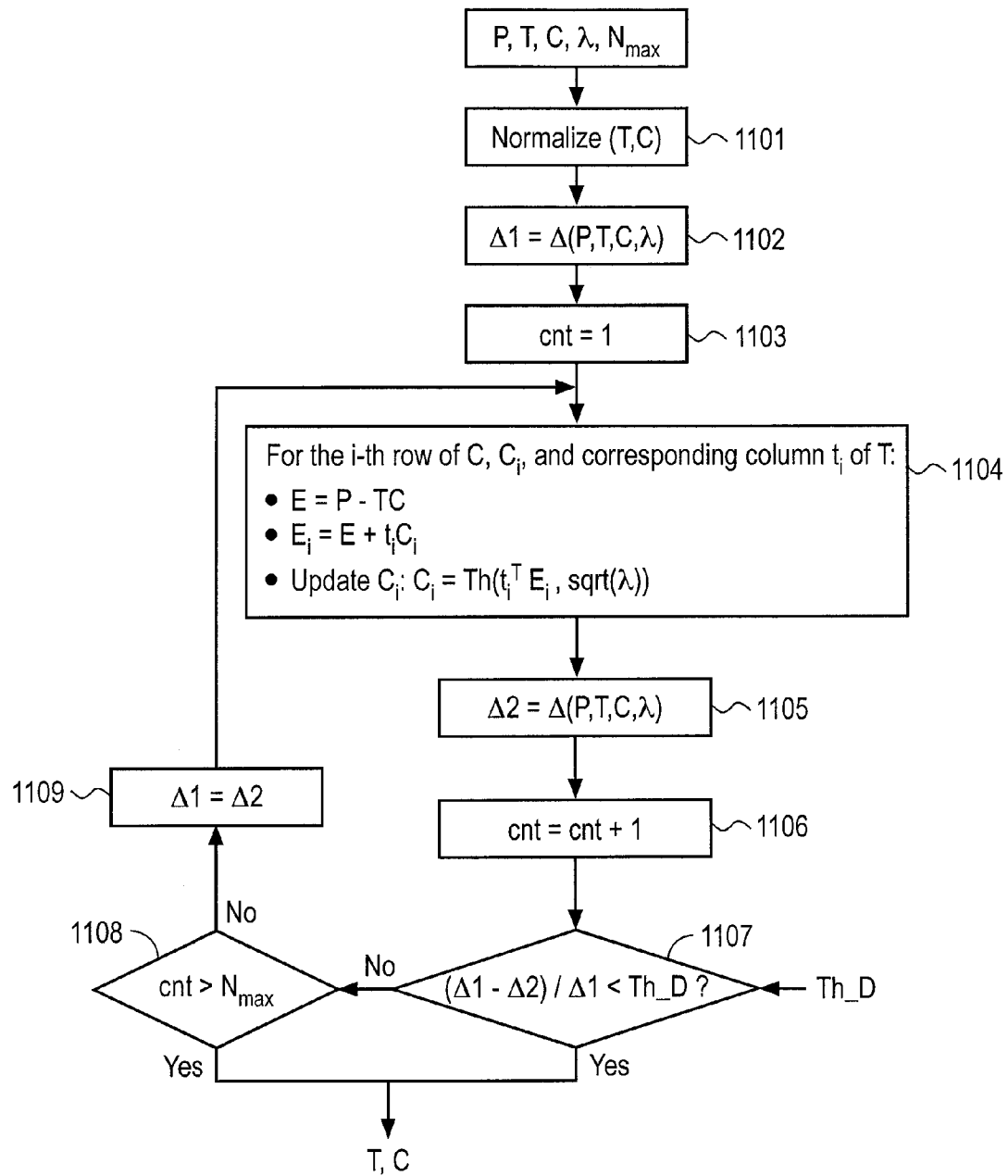
FIG. 11 is a flow diagram of one embodiment of a process for calculating a optimized decomposition.

For given P, T, C, $\lambda$, one embodiment of the process for performing [T, C]=Optimized_Decomposition(P, T, C, $\lambda$) is shown in FIG. 11 and is performed by processing logic that may comprise hardware (e.g., dedicated logic, circuitry, etc.), software (such as is run on a general purpose computer system or a dedicated machine), or a combination of both. The process is as follows:

1. [T,C]=Normalize_Decomposition(T, C) (processing block 1101).
2. Compute $\Delta 1 = \Delta(P, T, C, \lambda)$ (processing block 1102).
3. Set cnt=1 (processing block 1103)
4a. Let $C_i$ (1×M) denote the i-th row of C.
4b. For each column $t_i$ of T, i=1, . . . , K:
   compute the error of current representation and subtract the contribution of $t_i$:

$E = P - T \cdot C$ $E_i = E + t_i C_i$ compute the scalar product of $t_i$ with columns of $E_i$ and threshold them with $\sqrt{\lambda}$:

$$C_i' = Th(t_i^T \cdot E_i, \sqrt{\lambda}),$$

where $Th(a, b) = \begin{cases} 0, & |a| \leq b \\ a, & |a| > b \end{cases}$ for $b > 0$.

4c. Set the i-th row of C to be $C_i'$, i.e., $C_i = C_i'$ (processing block 1104).
5. Compute $\Delta 2 = \Delta(P, T, C, \lambda)$ (processing block 1105).
6. Increment cnt by 1 (processing block 1106).
7. Check if the relative change, $(\Delta 1 - \Delta 2)/\Delta 1$, is less than a given threshold Th_D (processing block 1107), or if a given maximum number of iterations has been reached (processing block 1108); otherwise, set $\Delta 1 = \Delta 2$ (processing block 1109) and go to processing block 1104.
8. Return T, C.

Figure 12:
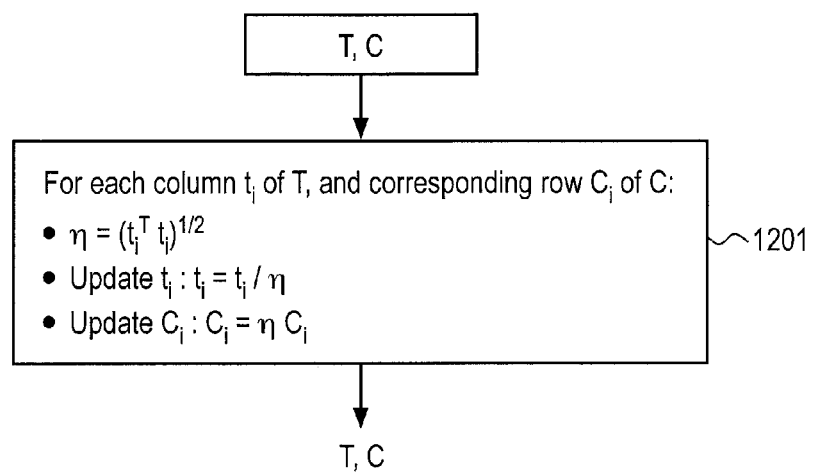
FIG. 12 is a flow diagram of one embodiment of a process for calculating a normalized decomposition.

One embodiment of the [T,C]=Normalize_Decomposition (T, C) procedure is shown in FIG. 12 and is performed by processing logic that may comprise hardware (e.g., dedicated logic, circuitry, etc.), software (such as is run on a general purpose computer system or a dedicated machine), or a combination of both. The process is as follows:

1. For each column $t_i$ of T and corresponding row $C_i$ of C
   a. $\eta = (t_i^T t_i)^{1/2}$
   b. $t_i = t_i / \eta$
   c. $C_i = \eta C_i$
   (processing block 1201).
2. Return T, C.

Figure 13:
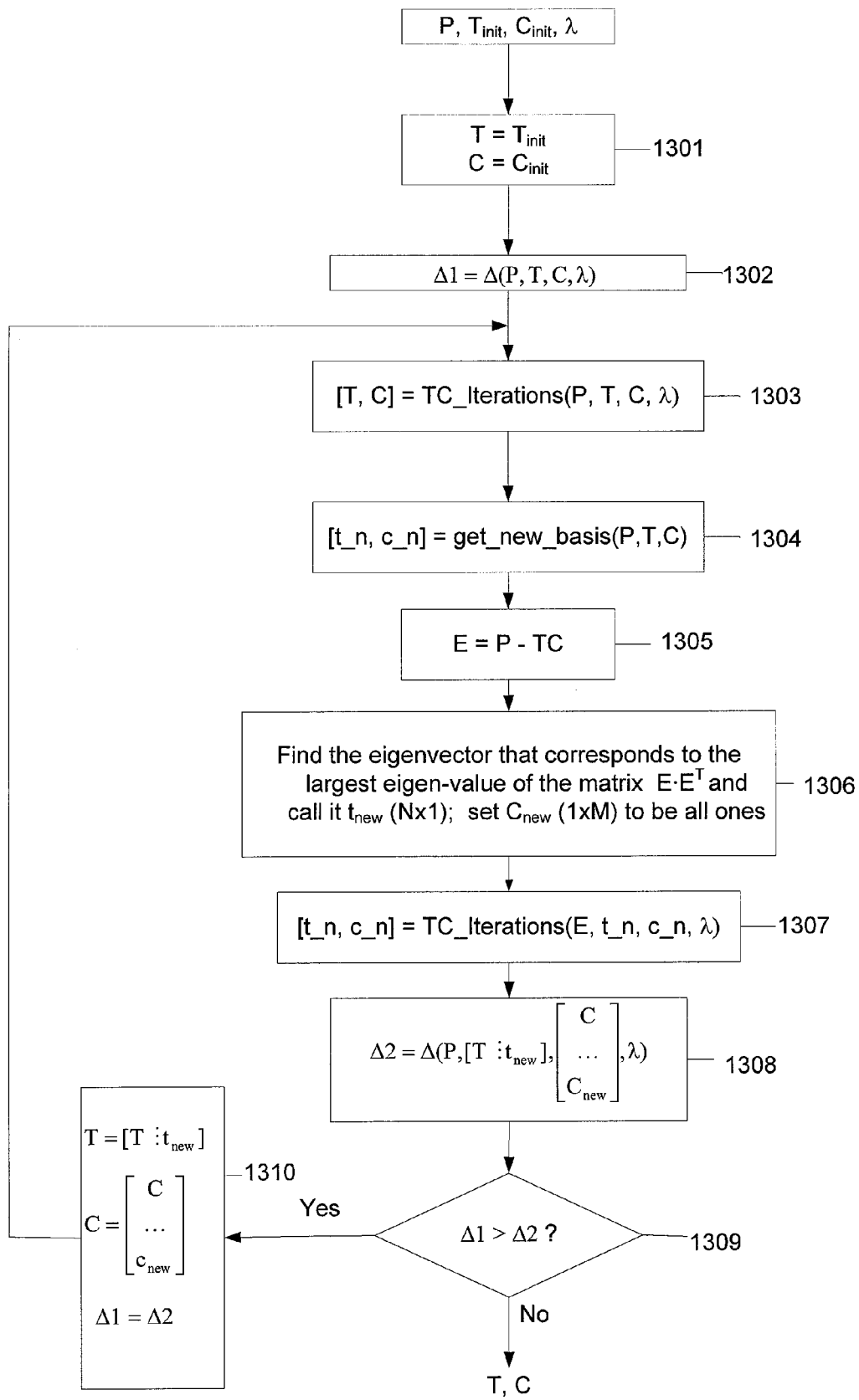
FIG. 13 is a flow diagram of one embodiment of a process for calculating complexity regularized decomposition.

Given the above two procedures, one embodiment of the complete algorithm for optimizing $\Delta$ is shown in FIG. 13. The process is performed by processing logic that may comprise hardware (e.g., dedicated logic, circuitry, etc.), software (such as is run on a general purpose computer system or a dedicated machine), or a combination of both. The process is as follows:

1. Get P, $T_{init}$, $C_{init}$, $\lambda$
2. Set $T=T_{init}$, $C=C_{init}$ (processing block 1301)
3. Compute $\Delta 1 = \Delta(P, T, C, \lambda)$ (processing block 1302)
4. Perform [T, C]=TC_Iterations(P, T, C, $\lambda$) (processing block 1303).
5. Find a candidate for expanding the T matrix (processing block 1304)
6. Compute $E = P - T \cdot C$ (processing block 1305).
7. Perform $[t_{new}, \alpha_{new}]$=TC_Iterations(E, $t_{new}$, $C_{new}$, $\lambda$) (processing block 1307).
8. Compute $$\Delta 2 = \Delta\left(P, [T:t_{new}], \begin{bmatrix} C \\ \ldots \\ C_{new} \end{bmatrix}, \lambda\right)$$

(processing block 1308).
9. Determine whether $\Delta 1 > \Delta 2$ (processing block 1309)
  a. if $\Delta 1 > \Delta 2$, set $$T = [T:t_{new}], C = \begin{bmatrix} C \\ \ldots \\ c_{new} \end{bmatrix},$$

$\Delta 1 = \Delta 2$ (processing block 1310) and
go to processing block 1303.
  b. if $\Delta 1 \leq \Delta 2$, return T, C.

Figure 16:
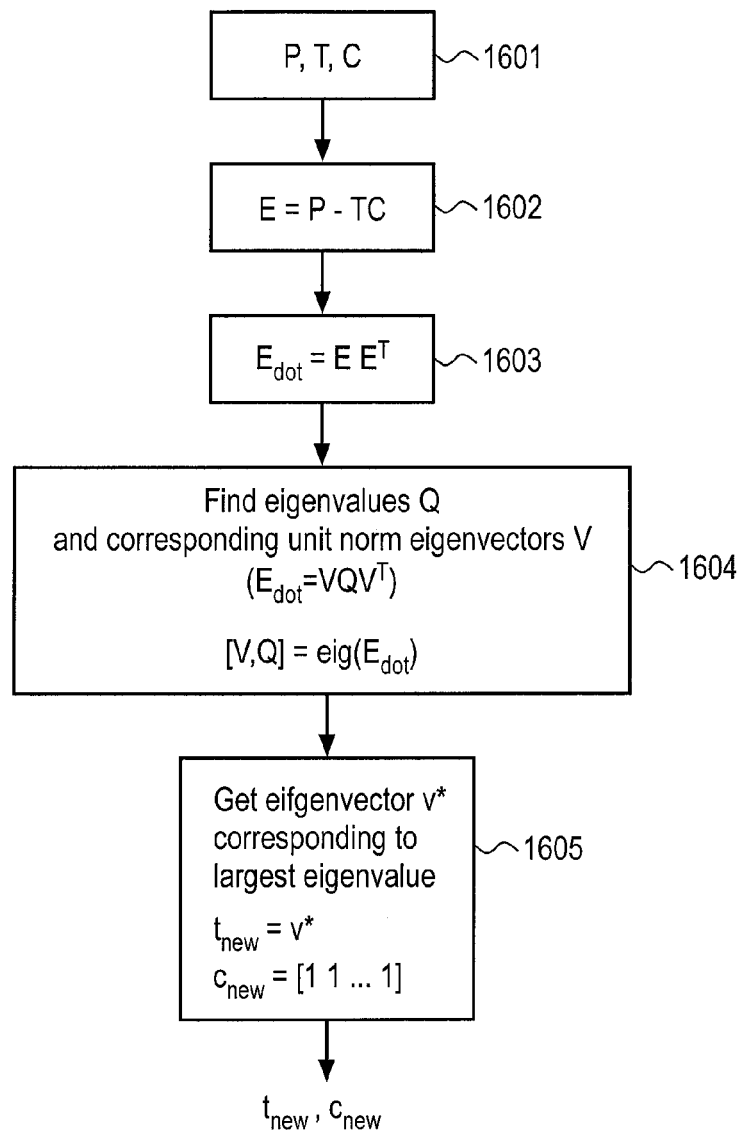
FIG. 16 is a flow diagram of one embodiment of a process for calculating a new candidate basis vector.

Various ways of conducting step 5 are examined in paragraphs [0077-0078] and FIG. 16.

Optimization Sweep

In one embodiment, the optimization is performed by sweeping the $\lambda$ parameter to generate optimized T, C pairs for each $\lambda$. In such a case, $\lambda$ can start from a very high value, $\lambda_{max}$, such as 10000, 157913.73, max_value×$N^{1/2}$, where max_value is the maximum possible value for a pixel, such as 255 for 8-bit images, etc., and come down to a low value, $\lambda_{min}$, such as 7, 1.12, 0.23, 0, etc. In one embodiment, $\lambda$ is reduced from $\lambda_{max}$ to $\lambda_{min}$ linearly, i.e., $\lambda_n = \lambda_{n-1} - d\lambda$, where $d\lambda = (\lambda_{max} - \lambda_{min})/\text{max\_iter}$, n=1, 2, ..., max_iter, and $\lambda_0 = \lambda_{max}$. The variable max_iter could be 10, 13, 20, 100, etc., or any value that determines the desired number of sweep points. $\lambda$ can also be reduced nonlinearly. When $\lambda = \lambda_{max}$, $T_{init}$ and $C_{init}$ can be set as two vectors containing all zero values. $T_{init}$ can also be set to a vector of all ones, or to some other non-zero, vector value. Once the algorithm is performed for stage n, the T and C values found for $\lambda_n$ can be used as $T_{init}$ and $C_{init}$ values for the optimization at stage n+1, i.e., for $\lambda_{n+1}$.

In one embodiment, the sweep procedure is stopped when the complexity $\mathcal{C}_n$, computed at stage n, exceeds the desired complexity.

In one embodiment, the sweep procedure is performed for the entire range with the results used to construct a lookup table (LUT) consisting of n, $T_n$, $C_n$, $\lambda_n$, $\mathcal{C}_n$, $\mathcal{D}_n$ values for easy consultation in applications. The $\mathcal{C}_n$ and $\mathcal{D}_n$ values can also be used to construct a curve for the pattern-bag that is similar to rate-distortion curves for images/video.

Compression

In one embodiment, all patterns (e.g., all non-overlapping blocks of size W×H) are extracted from an image and an encoder determines which subset of the patterns should be compressed using the Complexity Regularized Compression algorithm In one embodiment, this is done in a way to maximize rate-distortion performance averaged over all of the patterns.

In one embodiment, classification of the patterns that should be compressed with the complexity regularized compression algorithm is determined as follows. Using all extracted patterns the complexity regularized representation (T, C) is derived. An initial block classification determines which patterns are better represented using a fixed, non-adaptive basis $T_{fixed}$ (such as the Discrete Cosine Transform—DCT) and which patterns are better represented using T, the basis derived from the complexity regularized decomposition. This determination is done using the metric $\mathcal{D} + \lambda \mathcal{C}$ which combines distortion, $\mathcal{D}$, with complexity, $\mathcal{C}$, through a Lagrange parameter $\lambda$. For the fixed basis, complexity involves only the number of nonzero expansion coefficients since the fixed basis, $T_{fixed}$, is known in advance. For the complexity regularized decomposition nonzero values in T also need to be counted, since the decoder has to be informed about the complexity regularized decomposition basis T. The combined complexity C is thus the number of non-zero expansion coefficients on all blocks (those using $T_{fixed}$ and those using T) plus the number of nonzero values in T assuming one or more patterns uses the complexity regularized decomposition. After this initial classification of patterns is done, the complexity regularized representation can be re-derived using only the patterns that have been classified to use the complexity regularized representation.

Once the complexity regularized representation is determined final classification is done to optimize rate-distortion using, for example, methods similar to application Ser. No. 12/186,439, entitled "Image and Video Compression Using Sparse Orthonormal Transforms," filed Aug. 5, 2008 and application Ser. No. 11/643,925, entitled "Geometrical Image Representation and Compression," filed on Dec. 22, 2006. The classification map and the pattern basis in T are signaled to the decoder. The expansion coefficients with respect to T and $T_{fixed}$ are signaled similar to transform coding procedures.

In one embodiment, the above classification and derivation of the complexity regularized representation are performed iteratively so that the representation is rederived for a given classification followed by reclassification using the given representations, resulting in a final complexity regularized representation. In one embodiment, iterations are done so that the T, C, values found in a previous iteration are used as $T_{init}$ and $C_{init}$ for the next iteration.

In one embodiment, all patterns are initially represented using $T_{fixed}$ and the complexity regularized representation is derived in $T_{fixed}$ domain.

In one embodiment, $\lambda$ above is determined so that $\mathcal{D}$ matches a target distortion $\mathcal{D}_{target}$. In another embodiment, $\lambda$ is also determined so that $\mathcal{C}$ matches a target complexity $\mathcal{C}_{target}$. This can be done using the above outlined sweep procedure, or using a bisection algorithm.

Hypothesis Testing for Pattern Presence

Figure 14:
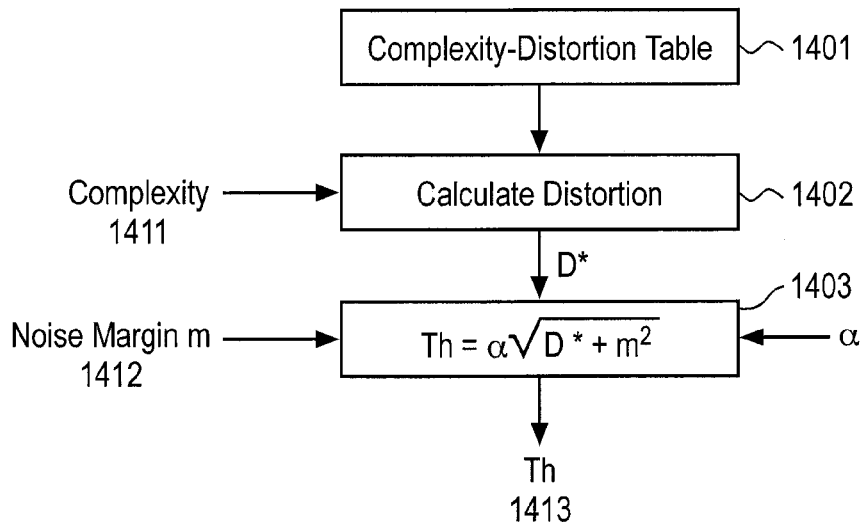
FIG. 14 is a flow diagram of one embodiment of a process for calculating a match threshold for hypothesis testing.

In one embodiment, hypothesis testing is done by comparing pattern presence statistics to a given threshold $T_h$ in FIG. 5. The calculation of the threshold can be done based on the desired complexity allowed to the search algorithm. Using the desired complexity one can obtain the per-pattern distortion or average distortion per-pattern resulting from the representation of the pattern-bag using the complexity regularized representation. FIG. 14 is a flow diagram of one embodiment of the process for calculating a match threshold for hypothesis testing. The process is performed by processing logic that may comprise hardware (e.g., dedicated logic, circuitry, etc.), software (such as is run on a general purpose computer system or a dedicated machine), or a combination of both. The process is as follows:

1. Create a Complexity-Distortion lookup table (processing block 1401). In one embodiment, this is done as described in paragraph 0049 above.
2. Calculate distortion based on complexity (1411) by consulting the complexity-distortion lookup table 1401 (processing block 1402).
3. Calculate threshold Th=$\alpha\sqrt{D^*+m^2}$ based on distortion and noise margin m (1412) (processing block 1403).
4. Output threshold Th (processing block 1413)

One can also perform the optimization sweep as above and obtain the per-pattern distortion from the resulting complexity vs. distortion curves or from the values stored in the LUT. A suitable noise margin is added to this distortion to obtain a final threshold that can be used in hypothesis testing. The noise margin can be determined based on the characteristics of the cameras used in imaging the scenes, the noise expected to be present in the scenes, using well known noise estimation techniques in the art, or some other value, e.g., $m^2=N5.17, m^2=N171.02, m^2=N1533$, etc.

In one embodiment, the components of the pattern presence statistics are checked independently with respect to derived threshold to determine the presence indicator, for example, to detect the presence of at least one of the patterns. In another embodiment, when the pattern-bag is determined from a region of interest, the presence of the region of interest is determined when at least a given number, $\mathfrak{N}$, of the patterns match. This allows testing for the presence of a substantial portion of the ROI in the target image.

In one embodiment, hypothesis testing is done by checking the pattern presence statistics with respect to a threshold in a combined way that accounts for the geometric relationships of the patterns overlapping the ROI. For example, the presence of patterns that account for at least a specified percentage of the area of the ROI, the presence of connected patterns that account for at least a specified percentage of the area of the ROI, etc. This is done to detect ROI in the presence of occlusions, etc.

Alternate Embodiments

Pattern Masks

Figure 15:
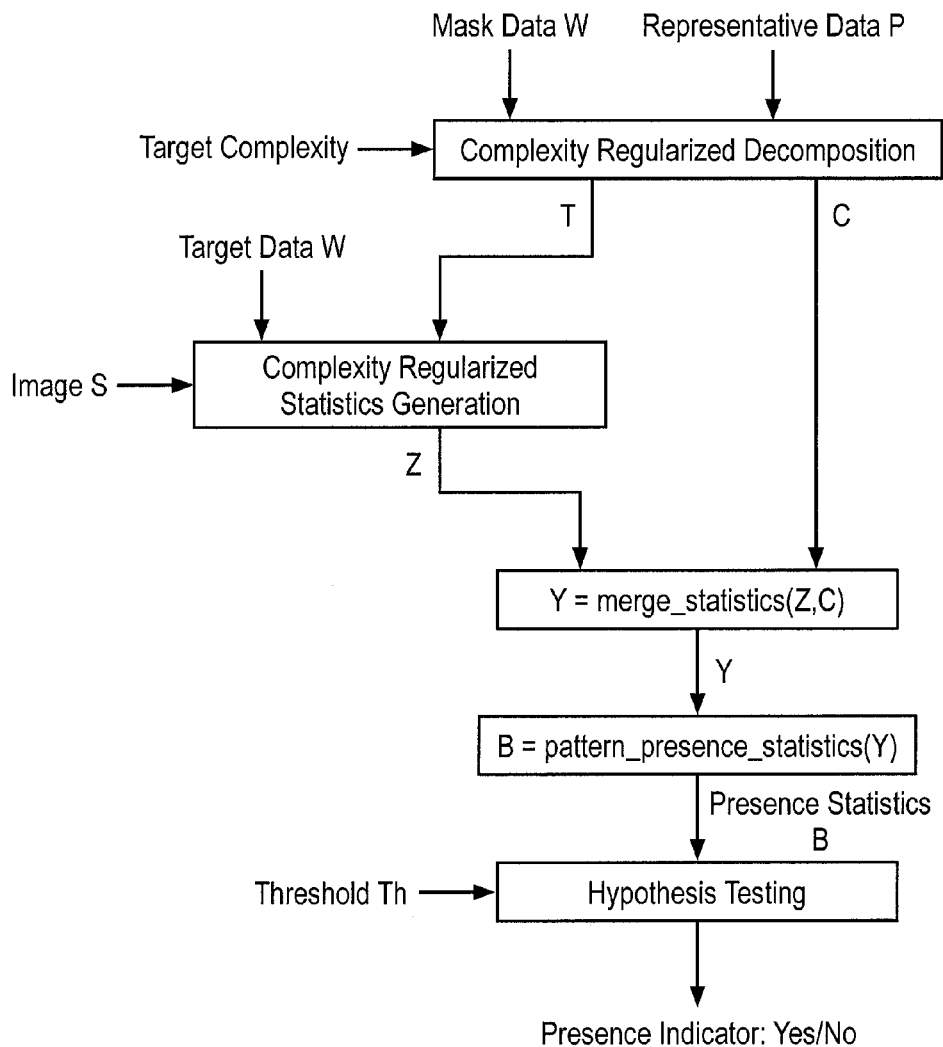
FIG. 15 is a flow diagram of one embodiment of a process for searching for masked patterns using computational complexity regularized decomposition.

In one embodiment, a binary mask is defined for each pattern in the pattern-bag. Similar to the construction of P, these masks are organized into a N×M matrix W and are used in a variant to the process of FIG. 5, which is shown in FIG. 15. Note that the distortion $\mathfrak{D}=\|P-T\cdot C\|_2^2$ in (1) can be written as $$\mathfrak{D} = \sum_{i=1}^{M}\sum_{j=1}^{N}\left(P(j,i) - \sum_{k=1}^{K}T(j,k)C(k,i)\right)^2. \quad (5)$$

When masks are defined, this distortion expression is changed to $$\mathfrak{D} = \sum_{i=1}^{M}\sum_{j=1}^{N}W(j,i)\left(P(j,i) - \sum_{k=1}^{K}T(j,k)C(k,i)\right)^2, \quad (6)$$

where W(j,i) selects the pixels in each pattern and its associated representation that are deemed important. This form is important when shapes of patterns are more important than the actual pixel values depicted in patterns. In order to accommodate masks, the search procedure can also be changed to use localized matching techniques such as described in application Ser. No. 11/929,420, entitled "Spatial Sparsity Induced Temporal Prediction for Video Compression,' filed Oct. 30, 2007.

It can be shown that this results in a complexity which can be approximated via (7) below, with p,q=0, and r,s=2. The optimization procedures are changed to accommodate these versions of $\mathfrak{D}$ and $\mathcal{C}$.

Library

In one embodiment, the library is organized so that the results of each pattern presence search is used to determine the next image/patch to be searched. For example, if the closest pattern in P to s is of distance d, then one can infer that any patch s' that is within distance $\epsilon$ of s will be at least of distance d-$\epsilon$ to s'. The library of images can thus be organized similar to the organization of structured vector quantization (VQ) dictionaries so that the output of the search for pattern presence in s can be utilized to narrow down the search in the library. This can be done similar to VQ search techniques, for example, by searching over an initial subset of the library, finding the images/patches in the subset with the k smallest distance to the pattern-bag, and concentrating the search on images/patches within neighborhoods of those, etc.

In one embodiment, library images are filtered, selected, and processed based on geographic location of the user, the weather at the time of the request, accelerometer, gyroscope, and other data supplied by the user device. The user query patterns can likewise be filtered and processed, for example, contrast enhanced, geometrically warped to major axis, etc., in order to enable more accurate and faster matching.

Transform/Pixel Domain Representations

In one embodiment, the above representation, search, and compression algorithms are performed in a transform domain. The transform domain can be wavelet transform domain, complex wavelet transform domain, DCT domain, Gabor transform domain, etc. In this case the pattern-bag, P, images in which patterns are searched, s, are specified in transform domain. This can be done by evaluating the desired transform on the pixel domain representations of these quantities and deriving the complexity regularized representation using the transformed quantities. This allows taking advantage of a compact description that is not optimal but that still aides the computation/compression performance, for example, by resulting in less storage for the images in the library. For complexity regularized compression the target image is first transformed and the algorithm performed on transformed patches.

One can also perform an expansive or overcomplete subband decomposition of the image, proceed with the search algorithm using patterns extracted from individual subbands, and combine sub-band search results in the end.

Complexity Metrics

In one embodiment, the metric $\mathcal{D}+\lambda\mathcal{C}$ is optimized using the complexity metric $$\mathcal{C} = A_1 \|C\|_p^r + A_2 \|T\|_q^s \qquad (7)$$

where $A_1$, $A_2$ p, q, r, s are nonnegative constants and $$\|T\|_q = \left( \sum_{m=1}^{N} \sum_{n=1}^{K} |T(m,n)|^q \right)^{1/q} \text{ for } q > 0,$$

and $$\|C\|_p = \left( \sum_{m=1}^{K} \sum_{n=1}^{M} |C(m,n)|^p \right)^{1/p} \text{ for } p > 0.$$

In another embodiment, the metric $\mathcal{D}+\lambda\mathcal{C}$ is optimized using the distortion metric $\mathcal{D}=\|U(P-TC)V\|_q$ where U and V are application specific weight matrices.

Per-Pattern Distortion

In order to give per-pattern guarantees, in one embodiment, the complexity regularized decomposition is derived so that the pattern having the worst representation distortion has distortion less than a given amount $\mathcal{D}$. The expansion coefficients of all patterns having distortion less than $\mathcal{D}_w$ are also adjusted to reduce and/or minimize the number of expansion coefficients, i.e., when possible expansion coefficients are discarded while the pattern's distortion does not exceed $\mathcal{D}_w$ and expansion coefficients are added when the pattern's distortion exceeds $\mathcal{D}_w$.

Parallel Hardware Implementations

In one embodiment, all calculations for search, compression, and representation are implemented in parallel hardware such as multi-core processors, graphics processing units, etc. Note that the main components of the algorithm, such as the computation of pattern presence statistics, TC_iterations, etc., are easily parallelizable.

Video Compression Application

In one embodiment, the complexity regularized compression algorithm is applied to hybrid video compression by applying the algorithm to INTRA frames and to INTER frames independently. In one embodiment, complexity regularized compression algorithm is applied to an INTRA frame, the pattern basis T is derived and sent to the decoder. Then all INTER frames dependent on that INTRA frame utilize the derived T without deriving a separate T. In one embodiment, for each INTER frame dependent on an INTRA frame, a signal is sent that specifies whether a new pattern basis will be derived or whether the basis derived and sent for the INTRA frame will be used. In another embodiment, for each INTER frame, a pattern basis is derived and conditionally encoded based on the pattern basis derived and sent for the INTRA frame. In one embodiment, each INTRA/INTER frame pattern basis information is conditionally encoded based on all or a subset of previously encoded pattern basis. In one embodiment, pattern basis calculated for previous frames is used as $T_{init}$ for the current frame pattern basis computation.

Vector Quantization of the Columns in P

In one embodiment, the columns of the pattern-bag P are represented in terms of their vector quantized versions in a way that reduces the number of columns (patterns) in P. This reduces computational complexity by allowing the correlation coefficient, $Y_i=s^t p_i$, to be calculated for fewer patterns. This in turn allows the complexity regularized representation to simplify and result in fewer computations when searching the library S. In effect, the quantization process takes P and replaces it with a matrix $P_{vq}$ with fewer columns but with the same number of rows. Columns of $P_{vq}$ are termed as centroids. Each pattern in P is associated with a centroid which is referred to herein as its quantized version. All columns of P associated with (or clustered to) column j of $P_{vq}$ form column j's cluster. This association is such that $P_{vq}$ is searched for instead of P and if column j of $P_{vq}$ is found to match a library pattern, all columns in P that are quantized to (or clustered to) column j of $P_{vq}$ are considered to match that library pattern. The above vector quantization (VQ) process can be performed by techniques well established in the art, for example, by a k-means algorithm, by modified k-means algorithm, Lloyd-Max algorithm, Linde-Buzo-Gray algorithm, etc. The modified k-means algorithm starts with having 2 (or more) centroids (clusters), and if the condition for terminating the algorithm (as described below) is not met, the number of clusters grows until the condition is finally met.

In one embodiment, initialization for cluster centroids is accomplished via 2 or more randomly chosen patterns from the pattern-bag P.

There is a loop with conditions described as follows:
LOOP: do k-means with given centroids until k-means converges;
if the condition (as described below) is not met: add one or more centroids; each added centroid can be a pattern randomly chosen from the pattern-bag, with probability proportional to the square distance from its cluster's centroid; and
if condition (as described below) is met: break the loop, return centroids and cluster membership information.

The condition for breaking the loop can be established as: the average distance from patterns to their assigned centroids being less than a given positive number $\epsilon$; the maximum distance from patterns to their assigned centroids being less than $\epsilon$; etc.

Possibility of Overlapping Clusters During VQ

Instead of having each pattern belong to one and only one cluster, in one embodiment, a pattern from the pattern-bag, i.e., a column of P, can belong to more clusters, as long as the conditions for cluster membership (as described below) are met. In such an overlapping clustering scenario if column i of P is clustered to column j and k of $P_{vq}$, then i is considered to match a library pattern if either j or k are found to match that library pattern. In one embodiment, conditions for cluster membership can be: if the distance of the pattern from a cluster centroid is less than a given $\epsilon>0$, then the pattern can become a member of that cluster; membership to a given l ($l \geq 1$) number of clusters which are chosen as those with the closest centroids to the pattern; etc.

Successive Approximation of Search Method

Instead of searching using P, firstly P is approximated by its VQ representation $P_{vq}$, which in turn is represented by computation complexity regularized representation: $P_{vq} \Rightarrow T_{vq} C_{vq}$. First, a search for matching centroids/clusters is performed using $T_{vq} C_{vq}$. Once the matching clusters are determined, the algorithm proceeds to look for matches within the matching clusters. The algorithm can signal more than one cluster for further search, based on some criterion, e.g., all centroid approximations, i.e., columns of $T_{vq} C_{vq}$ with the distance to the library pattern less than $\epsilon' \geq 0$, are declared a match. The cluster members of each cluster i are represented by their own $T_i C_i$ which are determined using the patterns within that cluster using the techniques disclosed above. Once the matching clusters are found using $T_{vq} C_{vq}$, the search is made finer by continuing the search on all matching clusters i in turn, using $T_i C_i$ and $0 \leq \epsilon'' \leq \epsilon'$. Matching patterns within each cluster are found and all such patterns are considered to be matches.

In one embodiment, the successive approximation algorithm is made to go through more than one level of approximation, i.e., to have more approximation layers. In such a scenario, members of clusters are further approximated by their VQ representation, and the above described successive approximation search is repeated from a coarse to fine fashion.

Different Ways of Adding a New Candidate Basis Vector to the Representation

FIG. 16 is a flow diagram of one embodiment of a process for calculating a new candidate basis vector. The process is performed by processing logic that may comprise hardware (e.g., dedicated logic, circuitry, etc.), software (such as is run on a general purpose computer system or a dedicated machine), or a combination of both. The process is as follows:
1. E=P−TC (processing block 1602)
2. $E_{dot}$=E $E^T$ (processing block 1603)
3. Find Eigenvalues Q and corresponding unit norm eigenvectors V
($E_{dot}$=VQ$V^T$)
[V,Q]=eig($E_{dot}$)
(processing block 1605)
4. Get eigenvector v* corresponding to largest eigenvalue
$t_{new}$=v*
$c_{new}$=[1 1 . . . 1]
(processing block 1604)
5. Output $t_{new}$, $c_{new}$ In the process of FIG. 16, rather than using an eigen decomposition, the initialization of template vectors can also be done in other ways, for example, by using the weighted average of the error of current representation, by picking the error vector with the largest squared-norm, by randomly picking an error vector, etc.

Different Factorizations

In one embodiment, the complexity regularized representation is computed in terms of more sophisticated factorizations using factors of the form: $TC_1C_2 \ldots C_{n_c}$ $n_c \geq 1$. For example, additive factorization is performed as follows:

$$P \Rightarrow \sum_{i=1}^{Nf} T_i C_{i,1} \ldots C_{i,ni}, Nf \geq 1, n_i \geq 1 \text{ for all } i$$

In this case, the metric in equation (3) is then calculated as $$\left\| P - \sum_{i=1}^{Nf} T_i C_{i,1} \ldots C_{i,ni} \right\|^2 + \lambda \sum_{i=1}^{Nf} (\|T_i\|_0 + \|C_{i,1}\|_0 + \ldots + \|C_{i,ni}\|_0)$$

Generation of a Search Program

Figure 18:
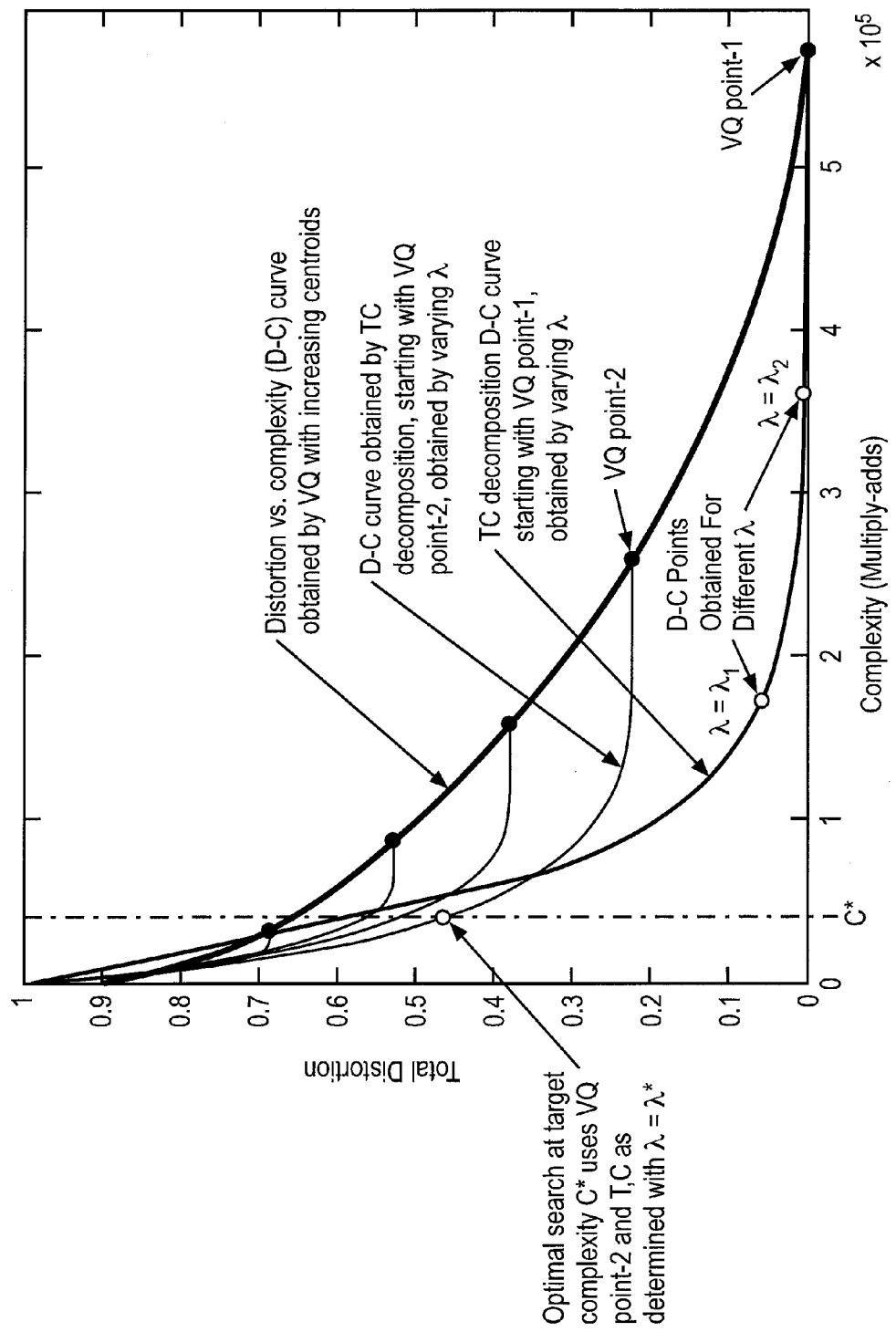
FIG. 18 illustrates an example of a distortion vs. complexity graph.

Based on the input image and marked ROI, the algorithm computes the VQ of the patterns in P, the TC decomposition of the resulting cluster centroids, as well as the TC decomposition of the individual clusters based on given complexity constraints. The algorithm does so by calculating a sequence of VQ points that progressively increase the number of centroids (e.g., from 0 to M) and reduce distortion. Each VQ point corresponds to a distortion and complexity, with the latter equal to the number of centroids multiplied by N. For each calculated VQ point, the algorithm calculates several TC decompositions by increasing λ (see FIG. 18). All decisions that can be taken by the algorithm can be traced on distortion vs. complexity curves, and the algorithm plots all such curves and at the target complexity (distortion) level finds the point that results in the minimum distortion (complexity). FIG. 18 illustrates an example of such a curve. The parameters that determine that point (VQ parameters, successive approximation parameters, TC decomposition parameters, etc.) are the parameters used by the algorithm in conducting the particular search. This operation is done such that the algorithm also determines whether to use successive approximation or not, and the level of successive approximation to use, etc.

The resulting set of successive approximation levels, VQ points, TC decompositions, etc., form the search program. For purposes herein, the parameters and the matrices the algorithm chooses in a way to perform the search with minimal complexity are termed the search program.

Matching Adapted for Textures

In one embodiment, the matching process is adapted to search for textures. This can be done either by the disclosed algorithm as is or by modifying the match metric. The match metric can for example be changed as follows. Once the complexity regularized representation is computed, on a given library vector s, $z=s^T \cdot T$ is computed. The elements in z are thresholded using $\sqrt{\lambda}$, and the number of nonzero values after thresholding is counted. If this result matches the number of nonzero coefficients of any pattern vector approximant $\hat{p}_i$, i.e., the number of nonzero coefficients in the i-th column of the C matrix, then s is declared to match that pattern vector.

Using β

Computing similarity between patch $p_i$ and signal $s_j$ can be performed with a scaling factor β:

$$\beta^* = \min_{\beta} \|p_i - \beta s_j\|_2^2 \Rightarrow \delta(p_i, s_j) = \|p_i - \beta * s_j\|_2^2$$

where β is limited to a given subset of R, e.g., between 0.9 to 1.1, and −1.1 and −0.9.

Object Matching Algorithm

Once the distance matrix $\delta_{i,j} = \delta(s_i, \hat{p}_j)$ is obtained, it is lexicographically ordered and multiplied by a matrix B to produce the decision values for object matching. The results of the multiplication can be thresholded to arrive at object detection results. In one embodiment, B is generated as follows: suppose a subset of the patterns correspond to a particular appearance of an object or scene. Then, if similar patterns are found in the library, one can declare an object or scene match. Such object/scene match conditions can be specified in terms of a sequence of matching pairs, i.e., an appearance of an object can be said to be found in the library if $s_{i1}$ matches $\hat{p}_{j1}$, $s_{i2}$ matches $\hat{p}_{j2}$, . . . , $s_{iF}$ matches $\hat{p}_{jF}$, for some F>0. Since $\delta_{i,j} = \delta(s_i, \hat{p}_j)$ quantifies how well $s_i$ matches $\hat{p}_j$ one can obtain conditions for the matching of the k-th appearance of an object via $$\sum_{(i,j) \in \{(i_1,j_1),\ldots,(i_F,j_F)\}} B_{k, j*M+i} \delta_{i,j}$$

In one embodiment, B is a binary matrix and simply selects the relevant pattern pairs that should match. In another embodiment, B is a matrix containing values in the real numbers. In one embodiment, the matrix B is also approximated by $\hat{B} = T_B C_B$ so that the object appearance matching can also be calculated to prescribed computational complexity. $\hat{B} = T_B C_B$ can be calculated by using the techniques described herein via, $$\{T_B, C_B\} = \underset{T,C}{\operatorname{argmin}} \|B - T \cdot C\|_2^2 + \lambda'(\|C\|_0 + \|T\|_0).$$

Images in Different Representations and Domains

Images can be pre-filtered (e.g., noise removal, localized DC component removal etc.), or used in their original form prior to pattern extraction and the application of other techniques of embodiments of the invention.

Application of the Complexity Regularized Representation to Various Problems Involving Matrix Multiplication In many problems, one wishes to multiply given vectors $x_n$ with a matrix P. The representation and techniques of embodiments of the invention can be used to significantly accelerate the computations in these problems by replacing P by its complexity regularized representation. An example such problem is the recursive computation: $x_{n+1} = P^r x_n + b$, where recursive multiplications by $P^r$ are performed. One can use the disclosed decomposition P~TC (and various advanced forms of it) to significantly reduce number of multiply-adds in the computation.

Execution of the Algorithm on a Cloud Computing Platform

In one embodiment, the adaptation or portions thereof are executed on a cloud computing platform. The library patterns, i.e., the matrix S, are stored on a cloud computing platform in a distributed way. The user sends in an image with marked ROI; from there, P is extracted, complexity regularized representation is computed on that P, and the search for matches between S and P is performed on the cloud. P extraction and the generation of the complexity-regularized representation can be performed either directly on the cloud, or on the user's device (e.g. mobile phone). In the latter case of the complexity-regularized representation is transmitted to the cloud. The cloud returns matching result to the user; in case a match was found, the user receives information on the found object and its position in the original image.

Alternatively P is stored on a cloud computing platform, user sends S, i.e., user image forms S. This embodiment allows the complexity regularized representation and the search program for P to be computed offline and stored for very rapid search results. Once the user transmits S, the stored search program for P is applied on S to generate search results, i.e., without calculating a complexity regularized representation for S. In another alternative embodiment the complexity regularized representation is computed for both P and S individually and the pair of results are used to approximate the P'S calculation.

Fixed Point Arithmetic

In one embodiment, the TC decomposition and other factorizations are computed so that the values in the matrices are constrained to be fixed point numbers. This allows fixed point arithmetic to be applied in the matching calculations.

Complexity Regularized Representation Calculated Offline

In one embodiment, an environment is imaged offline. Interesting objects in the environment are labeled and an ROI is derived for each object. Then the complexity regularized representation as well as search programs for each object are derived and stored in a server. All of these derivations and storage is done offline. Then a user imaging the same environment marks an ROI on the acquired images/video or an ROI is automatically detected on the user images/video. The image data as well as the ROI are transmitted to the server where matching is performed with respect to the stored data. Matches as well as the labels for matching objects are returned to the user. This embodiment allows the computations associated with the representations disclosed within this invention to be done offline.

An Example of a System

Figure 17:
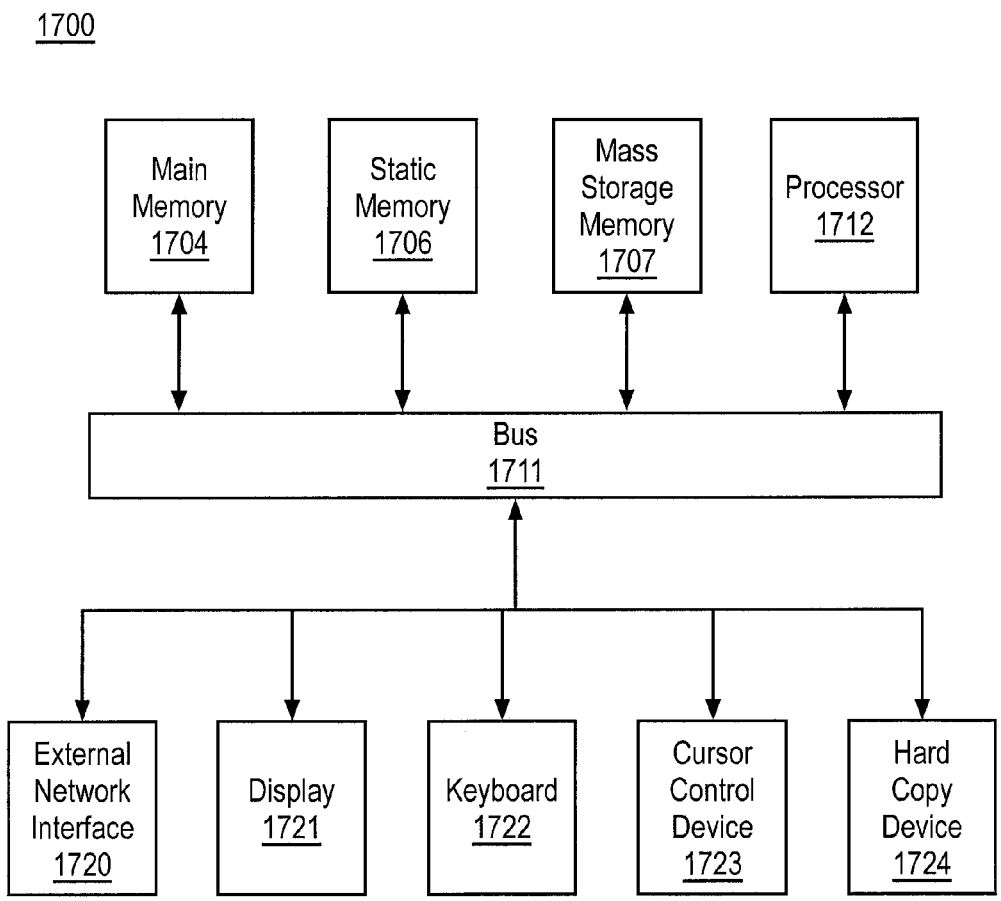
FIG. 17 is a block diagram of one embodiment of a system.

FIG. 17 is a block diagram of an exemplary computer system that may perform one or more of the operations described herein. Referring to FIG. 17, computer system 1700 may comprise an exemplary client or server computer system. Computer system 1700 comprises a communication mechanism or bus 1711 for communicating information, and a processor 1712 coupled with bus 1711 for processing information. Processor 1712 includes a microprocessor, but is not limited to a microprocessor, such as, for example, Pentium™, PowerPC™, Alpha™, etc., and may include more than one processor or a processor with a multi-core or multi-thread capability.

System 1700 further comprises a random access memory (RAM), or other dynamic storage device 1704 (referred to as main memory) coupled to bus 1711 for storing information and instructions to be executed by processor 1712. Main memory 1704 also may be used for storing temporary variables or other intermediate information during execution of instructions by processor 1712.

Computer system 1700 also comprises a read only memory (ROM) and/or other static storage device 1706 coupled to bus 1711 for storing static information and instructions for processor 1712, and a data storage device 1707, such as a magnetic disk or optical disk and its corresponding disk drive. Data storage device 1707 is coupled to bus 1711 for storing information and instructions.

Computer system 1700 may further be coupled to a display device 1721, such as a cathode ray tube (CRT) or liquid crystal display (LCD), coupled to bus 1711 for displaying information to a computer user. An alphanumeric input device 1722, including alphanumeric and other keys, may also be coupled to bus 1711 for communicating information and command selections to processor 1712. An additional user input device is cursor control 1723, such as a mouse, trackball, trackpad, stylus, or cursor direction keys, coupled to bus 1711 for communicating direction information and command selections to processor 1712, and for controlling cursor movement on display 1721.

Another device that may be coupled to bus 1711 is hard copy device 1724, which may be used for marking information on a medium such as paper, film, or similar types of media. Another device that may be coupled to bus 1711 is a wired/wireless communication capability 1725 to communication to a phone or handheld palm device.

Note that any or all of the components of system 1700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

The invention claimed is:

1. A method comprising:
    extracting one or more target patterns from a portion of an image;
    forming a pattern matrix based on the one or more target patterns;

approximating the pattern matrix using a complexity-regularized representation derived from the pattern matrix;

sending a query to search a library of images for vectors in the query to detect, using the complexity-regularized representation, any image in the library that contains image patches similar to the one or more target patterns;

performing operations that include:
    finding a correlation coefficient with a patch extracted from the library for each pattern represented in terms of the complexity-regularized representation, including generating a complexity regularized statistics matrix and combining the complexity regularized statistics matrix with one descriptor of the complexity-regularized representation to obtain correlation results for all patterns;

generating pattern presence statistics from correlation coefficients; and for each pattern, comparing a pattern presence statistic for said each pattern to a threshold to determine if said each pattern is present in the patch.

2. The method defined in claim 1 wherein the target patterns are image patches.

3. The method defined in claim 1 wherein extracting the one or more target patterns comprises decomposing the portion of an image into a set of overlapping patches.

4. The method defined in claim 1 further comprising selecting a region of interest in the image prior to extracting patterns, the region of interest being the portion of the image.

5. The method defined in claim 1 wherein the pattern matrix comprises the one or more target patterns and modified versions of the one or more target patterns.

6. The method defined in claim 5 wherein the number of modified versions to generate is determined based on a pre-determined complexity of the search.

7. The method defined in claim 5 further comprising:
generating a set of modified versions on the portion of the image;
extracting additional target patterns from each modified version; and
creating a matrix with the target patterns and the additional target patterns.

8. The method defined in claim 5 wherein generating a set of modified versions on the portion of the image comprises applying one or more geometric transformations and distortions to the portion of the image.

9. The method defined in claim 1 or 5 further comprising processing the pattern matrix to remove similar vectors, prior to approximating the pattern matrix.

10. The method defined in claim 9 wherein processing is performed using vector quantization.

11. The method defined in claim 10 wherein at least one pattern in the pattern matrix belongs to a plurality of clusters, and further wherein a match of a pattern in the library occurs if any of the columns in a vector quantized version of the pattern matrix to which a column in the pattern matrix is clustered matches the pattern in the library.

12. The method defined in claim 1 wherein approximating the pattern matrix comprises performing a factorizing decomposition the pattern matrix into two matrices.

13. The method defined in claim 1 wherein the complexity-regularized representation are derived based on matching accuracy subject to computational complexity allowed to search.

14. The method defined in claim 1 wherein the complexity-regularized representation comprise a pattern basis and a coefficient matrix.

15. The method defined in claim 14 wherein approximating the pattern matrix comprises running an optimization routine to update coefficients in the coefficient matrix and the pattern basis based on minimizing a measure that is inversely proportional to matching accuracy for a given a computational complexity indication indicative of the computational complexity of the search.

16. The method defined in claim 15 wherein computational complexity indication is subject to a constraint.

17. The method defined in claim 16 wherein the constraint comprises a Lagrangian multiplier.

18. The method defined in claim 1 further comprising repeating the operations for all candidate patches from the image and for all candidate images in the library.

19. The method defined in claim 1 further comprising determining the presence of at least one pattern based on pattern presence statistics.

20. The method defined in claim 1 further comprising determining that the portion is in the library based on a pre-determined number of matches between the approximated pattern matrix and the library.

21. The method defined in claim 1 further comprising applying a binary mask to each pattern in the pattern matrix prior to approximating the pattern matrix.

22. The method defined in claim 1 wherein the library is organized to enable results of each pattern presence search to be used to determine a next image portion to be searched.

23. The method defined in claim 1 wherein forming a pattern matrix based on the one or more target patterns and approximating the pattern matrix using the complexity-regularized representation derived from the pattern matrix are performed in the transform domain.

24. The method defined in claim 1 further comprising labeling one or more items in the image based on search results.

25. The method defined in claim 24 wherein the image is generated from a user taking a photo.

26. An article of manufacture comprising a non-transitory computer readable storage medium having stored thereon instructions which, when executed, cause one or more processors to perform a method comprising:

extracting one or more target patterns from a portion of an image;

forming a pattern matrix based on the one or more target patterns;

approximating the pattern matrix using a complexity-regularized representation derived from the pattern matrix;

sending a query to search a library of images for vectors in the query to detect, using the complexity-regularized representation, any image in the library that contains image patches similar to the one or more target patterns;

performing operations that include:
    finding a correlation coefficient with a patch extracted from the library for each pattern represented in terms of the complexity-regularized representation, including generating a complexity regularized statistics matrix and combining the complexity regularized statistics matrix with one descriptor of the complexity-regularized representation to obtain correlation results for all patterns;

generating pattern presence statistics from correlation coefficients; and for each pattern, comparing a pattern presence statistic for said each pattern to a threshold to determine if said each pattern is present in the patch.

27. An apparatus comprising:
a memory to store instructions; and
a processor coupled to the memory to execute the instructions to perform a method comprising:
   extracting one or more target patterns from a portion of an image;
   forming a pattern matrix based on the one or more target patterns;
   approximating the pattern matrix using a complexity-regularized representation derived from the pattern matrix; and
   sending a query to search a library of images for vectors in the query to detect, using the complexity-regularized representation, any image in the library that contains image patches similar to the one or more target patterns;
   performing operations that include:
      finding a correlation coefficient with a patch extracted from the library for each pattern represented in terms of the complexity-regularized representation, including generating a complexity regularized statistics matrix and combining the complexity regularized statistics matrix with one descriptor of the complexity-regularized representation to obtain correlation results for all patterns;
      generating pattern presence statistics from correlation coefficients; and
      for each pattern, comparing a pattern presence statistic for said each pattern to a threshold to determine if said each pattern is present in the patch.

28. A compression method comprising:
extracting non-overlapping blocks of an image;
determining which subset of patterns to compress;
forming a pattern matrix from the non-overlapping blocks;
deriving a complexity-regularized representation using the pattern matrix;
finding a correlation coefficient with a patch extracted from the library for each pattern represented in terms of the complexity-regularized representation, including generating a complexity regularized statistics matrix and combining the complexity regularized statistics matrix with one descriptor of the complexity-regularized representation to obtain correlation results for all patterns;
generating pattern presence statistics from correlation coefficients;
for each pattern, comparing a pattern presence statistic for said each pattern to a threshold to determine if said each pattern is present in the patch; and
sending a classification map and a pattern basis to the decoder to enable reconstruction.

29. The method defined in claim 28 wherein determining which subset of patterns to compress is based on which patterns are better represented using a fixed, non-adaptive basis and which patterns are better represented using a basis derived from a complexity regularized decomposition.

30. The method defined in claim 28 wherein determining which subset of patterns to compress is performed using a metric that combines distortion with complexity.

31. The method defined in claim 28 wherein distortion is combined with complexity using a Lagrange parameter.

32. A method comprising:
receiving, at a server, image data with a region of interest; and
performing matching of the region of interest to data accessed by the server using a complexity-regularized representation and a search program, including
   finding a correlation coefficient with a patch extracted from the region of interest for each pattern represented in terms of the complexity-regularized representation, including generating a complexity regularized statistics matrix and combining the complexity regularized statistics matrix with one descriptor of the complexity-regularized representation to obtain correlation results for all patterns;
   generating pattern presence statistics from correlation coefficients; and
   for each pattern, comparing a pattern presence statistic for said each pattern to a threshold to determine if said each pattern is present in the patch.

33. The method defined in claim 32 wherein the complexity-regularized representation and the search program are computed offline.

* * * * *